US00RE44058E

(19) United States
(12) Reissued Patent
Aubay et al.

(10) Patent Number: US RE44,058 E
(45) **Date of Reissued Patent: *Mar. 12, 2013**

(54) CLEANING COMPOSITION COMPRISING A WATER-SOLUBLE OR WATER-DISPERSIBLE POLYMER

(75) Inventors: Eric Aubay, Le Perreux sur Marne (FR); Dominic Yeung, Mississauga (CA)

(73) Assignee: Rhodia Chimie, Aubervilliers (FR)

( * ) Notice: This patent is subject to a terminal disclaimer.

(21) Appl. No.: 12/458,513

(22) Filed: Jul. 14, 2009

Related U.S. Patent Documents

Reissue of:
(64) Patent No.: 6,569,261
Issued: May 27, 2003
Appl. No.: 09/596,711
Filed: Jun. 19, 2000

U.S. Applications:
(60) Continuation of application No. 11/987,385, filed on Nov. 29, 2007, now abandoned, which is a division of application No. 11/139,006, filed on May 27, 2005.

(30) Foreign Application Priority Data

Jul. 15, 1999 (FR) ..... 99 09185

(51) Int. Cl.
*B08B 3/04* (2006.01)
*C11D 1/62* (2006.01)
*C11D 3/37* (2006.01)

(52) U.S. Cl. ..... 134/39; 134/38; 134/40; 134/42; 510/229; 510/238; 510/240; 510/241; 510/243; 510/244; 510/475; 510/480; 510/504

(58) Field of Classification Search ..... 510/229, 510/238, 240, 241, 243, 244, 475, 480, 504; 134/38, 39, 40, 42
See application file for complete search history.

(56) References Cited

U.S. PATENT DOCUMENTS

| | | | | |
|---|---|---|---|---|
| 3,766,156 | A | 10/1973 | Kine et al. | |
| 4,387,017 | A | 6/1983 | McEntire et al. | |
| 4,495,367 | A | 1/1985 | Dammann | |
| 4,784,789 | A | 11/1988 | Jeschke et al. | |
| 4,814,101 | A | 3/1989 | Schieferstein et al. | |
| 5,115,065 | A | 5/1992 | Ogawa et al. | |
| 6,554,869 | B2 * | 4/2003 | Aubay et al. | 8/137 |
| 6,565,142 | B1 | 5/2003 | Gibney, Jr. et al. | |
| 6,703,358 | B1 | 3/2004 | Aubay et al. | |
| 2002/0102359 | A1 | 8/2002 | Rohrbaugh et al. | |
| 2002/0144712 | A1 | 10/2002 | Barger et al. | |
| 2002/0160224 | A1 | 10/2002 | Barger et al. | |
| 2003/0034051 | A1 | 2/2003 | Barger et al. | |
| 2003/0134759 | A1 | 7/2003 | Geary et al. | |
| 2003/0216281 | A1 | 11/2003 | DeLeo et al. | |
| 2003/0220223 | A1 | 11/2003 | Scheuing et al. | |
| 2004/0013638 | A1 | 1/2004 | Aubay et al. | |

FOREIGN PATENT DOCUMENTS

| | | | |
|---|---|---|---|
| EP | 156646 | * | 10/1985 |
| EP | 0 602 254 | A1 | 6/1994 |
| EP | 1 202 625 | B1 | 10/2003 |
| EP | 1 362 907 | A2 | 11/2003 |
| EP | 1 196 523 | B1 | 9/2004 |
| JP | 61-69884 | A | 4/1986 |
| WO | WO 99/24004 | | 5/1999 |
| WO | WO 00/14053 | A1 | 3/2000 |
| WO | WO 01/05920 | A1 | 1/2001 |
| WO | WO 01/10213 | * | 2/2001 |
| WO | WO 01/10213 | A1 | 2/2001 |
| WO | WO 02/070612 | A1 | 9/2002 |

* cited by examiner

*Primary Examiner* — Brian P Mruk
(74) *Attorney, Agent, or Firm* — SNR Denton US LLP

(57) ABSTRACT

This invention relates to a cleaning composition comprising at least one surfacatant or at least one cosmetic vehicle and a water-soluble or water-dispersible copolymer comprising, in the form of polymerized units:

(a) at least one monomer compound of general formula I:

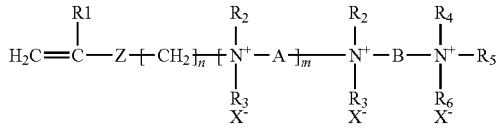

(b) at least one hydrophilic monomer carrying a functional group with an acidic nature which is copolymerizable with (a) and which is capable of being ionized in the application medium;

(c) optionally at least one hydrophilic monomer compound with ethylenic unsaturation with a neutral charge, carrying one or more hydrophilic groups, which is copolymerizable with (a) and (b).

49 Claims, No Drawings

CLEANING COMPOSITION COMPRISING A WATER-SOLUBLE OR WATER-DISPERSIBLE POLYMER

Matter enclosed in heavy brackets [ ] appears in the original patent but forms no part of this reissue specification; matter printed in italics indicates the additions made by reissue.

*CROSS-REFERENCE TO RELATED APPLICATIONS*

*This application is a continuation of U.S. patent application Ser. No. 11/987,385, filed Nov. 29, 2007 now abandoned, which is a divisional of U.S. patent application Ser. No. 11/139,006, filed May 27, 2005, which was filed as a Reissue Application of U.S. Pat. No. 6,569,261 B1, issued May 27, 2003, and claims priority under 35 U.S.C. §119 of FR 99/09185, filed Jul. 15, 1999, each hereby expressly incorporated by reference in its entirety and each assigned to the assignee hereof.*

*JOINT RESEARCH AGREEMENT*

*The disclosure and claims herein were made as a result of activities undertaken within the scope of a joint research agreement in effect on or before the date the claimed invention was made between Rhône-Poulenc Chimie and Unilever U.K. Central Resources Limited.*

A subject-matter of the present invention is a cleaning or rinsing composition intended for the treatment of industrial, domestic or communal hard surfaces, in particular of glass, window, ceramic, tiling, hard organic polymer, metal or wood type and the like, targeted at conferring on the latter hydrophilic properties and properties of protection (corrosion resistance) of glass, of dishes and of designs by washing media during repeated washing operations in an automatic dishwasher.

A more particular subject-matter of the invention is a cleaning composition intended for the treatment of a hard surface which is capable of conferring persistent hydrophilic properties on the latter, so as to prevent the subsequent presence of marks due in particular to the drying of drops of water deposited on said surface.

Commercial detergent formulations make it possible to efficiently clean industrial, domestic or communal hard surfaces. They are generally composed of an aqueous solution of surfactants, in particular of nonionic and anionic surfactants, of alcohol(s), in order to facilitate drying, and optionally of sequestering agents and of bases, in order to adjust the pH. A significant failing in these detergent formulations is that subsequent contact of the hard surface with water can result in the presence of marks during drying. This contact with water after application of detergent can originate, for example, from rainwater, in the case of windows, from mains water on bathroom tiling, or from rinsing water when the cleaning requires rinsing. It can also originate from the drying of the dishes in the open air, in the case of detergent formulae for cleaning dishes by hand, or from the drying of dishes in an automatic device when the detergent is intended for a dishwasher. In the case of the cleaning of dishes in an automatic device, said formula can either be used in the cleaning cycle (detergent formula) or during the rinsing (rinsing liquid).

The presence of marks or stains left on the hard surfaces by the water coming into contact with the latter is due to the phenomenon of contraction of the water drops on contact with the hard surface, which, during subsequent drying, leave marks on the surface which reproduce the original shapes and sizes of the drops.

Until now, no satisfactory solution to this problem existed.

To solve the problem posed by the retraction and the drying of the drops of water, the solution consists in increasing the hydrophilicity of the surface in order to obtain a contact angle between the hard surface to be treated and the drop of water which is as small as possible.

The studies of the Inventors which have led to the present invention have made it possible to determine that this problem can be solved in an efficient and lasting way by incorporating, in conventional cleaning compositions for hard surfaces, a water-soluble or water-dispersible organic polymer compound having both a function of interaction with the surface to be treated and a function conferring a hydrophilic nature on this surface.

A first subject-matter of the invention is a cleaning or rinsing composition comprising at least one water-soluble or water-dispersible copolymer comprising, in the form of polymerized units:

(a) at least one monomer compound of general formula I:

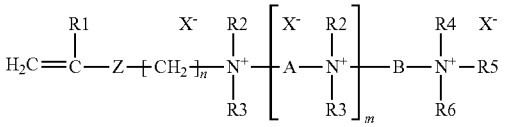

in which $R_1$ is a hydrogen atom or a methyl or ethyl group;

$R_2$, $R_3$, $R_4$, $R_5$ and $R_6$, which are identical or different, are linear or branched $C_1$-$C_6$, preferably $C_1$-$C_4$, alkyl, hydroxyalkyl or aminoalkyl groups;

m is an integer from 0 to 10, preferably from 0 to 2;

n is an integer from 1 to 6, preferably 2 to 4;

Z represents a —C(O)O— or —C(O)NH— group or an oxygen atom;

A represents a $(CH_2)_p$ group, p being an integer from 1 to 6, preferably from 2 to 4;

B represents a linear or branched $C_2$-$C_{12}$, advantageously $C_3$-$C_6$, polymethylene chain optionally interrupted by one or more heteroatoms or heterogroups, in particular O or NH, and optionally substituted by one or more hydroxyl or amino groups, preferably hydroxyl groups;

X, which are identical or different, represent counterions;

(b) at least one hydrophilic monomer carrying a functional group with an acidic nature which is copolymerizable with (a) and which is capable of being ionized in the application medium;

(c) optionally at least one monomer compound with ethylenic unsaturation with a neutral charge which is copolymerizable with (a) and (b), preferably a hydrophilic monomer compound with ethylenic unsaturation with a neutral charge, carrying one or more hydrophilic groups, which is copolymerizable with (a) and (b).

The monomer (a) can be prepared, for example, according to the following reaction schemes:

Reaction scheme No. 1:

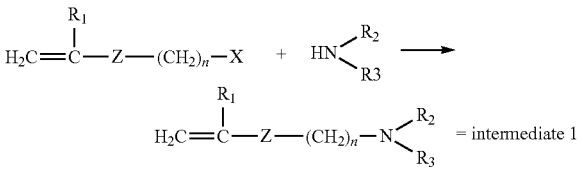

-continued

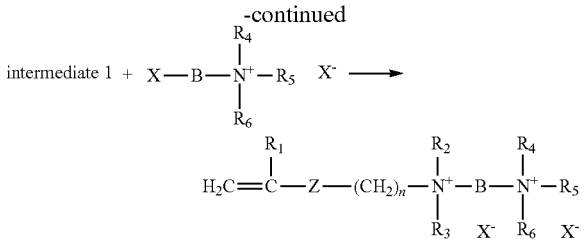

(when m is equal to 0)

Reaction scheme No. 2:

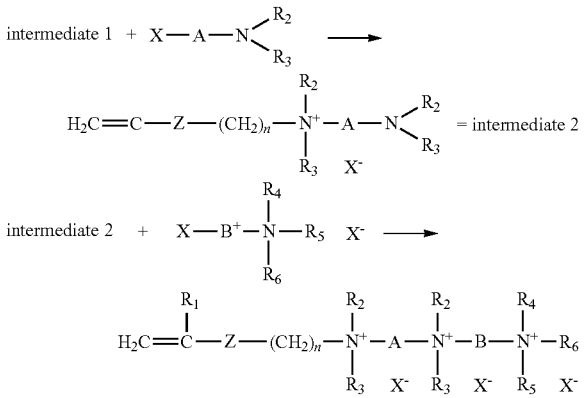

(when m is equal to 1)

Reaction scheme No. 3:

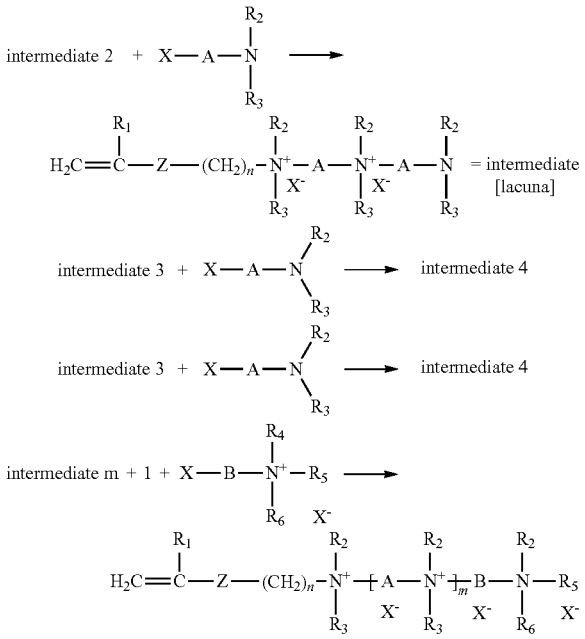

(when m is between 2 and 10)

The monomer (a) confers, on the copolymer, characteristics of interaction with the surface to be treated, making possible in particular anchoring of the copolymer to this surface.

The monomer (b) and optionally the monomer (c) confers hydrophilic characteristics on the copolymer which, after anchoring of the copolymer to the surface to be treated, are passed on to the surface.

This property of rendering the surface hydrophilic furthermore makes it possible to reduce the formation of condensation on the surface; this advantage can be made use of in cleaning formulae for windows and mirrors, in particular in bathrooms.

The copolymer according to the invention advantageously exhibits a molecular mass of at least 1000, advantageously of at least 10,000; it can range up to 20,000,000, advantageously up to 10,000,000.

Except when otherwise indicated, when the term molecular mass is used, it will refer to the weight-average molecular mass, expressed in g/mol. The latter can be determined by aqueous gel permeation chromatography (GPC) or measurement of the intrinsic viscosity in a 1N $NaNO_3$ solution at 30° C.

The copolymer is preferably a random copolymer.

Preferably, in the general formula (I) of the monomer (a),

Z represents C(O)O, C(O)NH or O, very preferably C(O)NH;

n is equal to 2 or 3, very particularly 3;

m ranges from 0 to 2 and is preferably equal to 0 or 1, very particularly to 0;

B represents

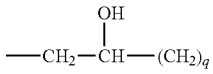

with q from 1 to 4, preferably equal to 1;

$R_1$ to $R_6$, which are identical or different, represent a methyl or ethyl group.

The preferred monomer (a) is Diquat of following formula:

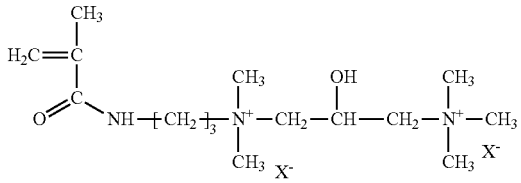

$X^-$ representing the chloride ion.

Other particularly advantageous monomers (a) are:

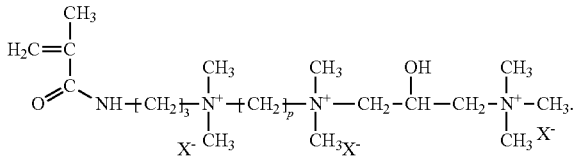

p = 2 to 4

The X anions are in particular a halogen, preferably chlorine, sulfonate, sulfate, hydrogensulfate, phosphate, phosphonate, citrate, formats and acetate anion.

The monomers (b) are advantageously $C_3$-$C_8$ carboxylic, sulfonic, sulfuric, phosphonic or phosphoric acids with monoethylenic unsaturation, their anhydrides and their salts which are soluble in water.

Mention may be made, among the preferred monomers (b), of acrylic acid, methacrylic acid, α-ethacrylic acid, β,β-dimethylacrylic acid, methylenemalonic acid, vinylacetic acid, allylacetic acid, ethylidineacetic acid, propylidineacetic acid, crotonic acid, maleic acid, fumaric acid, itaconic acid, citraconic acid, mesaconic acid, N-(methacroyl)alanine, N-(acryloyl)hydroxyglycine, sulfopropyl acrylate, sulfoethyl acrylate, sulfoethyl methacrylate, styrenesulfonic acid, vinylsulfonic acid, vinylphosphonic acid, phosphoethyl acrylate, phophonoethyl acrylate, phosphopropyl acrylate, phophonopropyl acrylate, phosphoethyl methacrylate, phophonoethyl methacrylate, phospbopropyl methacrylate, phophonopropyl methacrylate and the alkali metal and ammonium salts thereof.

Mention may be made, among the monomers (c), of acrylamide, vinyl alcohol, $C_1$-$C_4$ alkyl esters of acrylic acid and of methacrylic acid, $C_1$-$C_4$ hydroxyalkyl esters of acrylic acid and of methacrylic acid, in particular ethylene glycol and propylene glycol acrylate and methacrylate, polyalkoxylated esters of acrylic acid and of methacrylic acid, in particular the polyethylene glycol and polypropylene glycol esters, esters of acrylic acid or of methacrylic acid and of polyethylene glycol or polypropylene glycol $C_1$-$C_{25}$ monoalkyl ethers, vinyl acetate, vinylpyrrolidone or methyl vinyl ether.

The level of monomers (a) is advantageously between 3 and 80 mol %, preferably 10 to 60 mol %.

The level of monomers (b) is advantageously between 10 and 95 mol %, preferably 20 to 70 mol %.

The level of monomers (c) is advantageously between 0 and 50%, preferably 0 and 30%, very particularly from 5 to 25 mol %.

The molar ratio of cationic monomer to the anionic monomer (a)/(b) is advantageously between 80/20 and 5/95, preferably between 60/40 and 20/80.

The copolymers of the invention can be obtained according to known techniques for the preparation of copolymers, in particular by polymerization by the radical route of the starting ethylenically unsaturated monomers, which are known compounds or compounds which can be easily obtained by a person skilled in the art by employing conventional synthetic processes of organic chemistry.

Reference may in particular be made to the processes disclosed in U.S. Pat. No. 4,387,017 and EP 156,646.

The radical polymerization is preferably carried out in an environment which is devoid of oxygen, for example in the presence of an inert gas (helium, argon, and the like) or of nitrogen. The reaction is carried out in an inert solvent, preferably ethanol or methanol, and more preferably in water.

The polymerization is initiated by addition of a polymerization initiator. The initiators used are the free radical initiators commonly used in the art. Examples comprise organic peresters (t-butylperoxy pivalate, t-amylperoxy pivalate, t-butylperoxy α-ethylhexanoate, and the like); organic compounds of azo type, for example azobisamidinopropane hydrochloride, azobisisobutyronitrile, azobis(2,4-dimethylvaleronitrile), and the like); inorganic and organic peroxides, for example hydrogen peroxide, benzyl peroxide and butyl peroxide, and the like; redox initiating systems, for example those comprising oxidizing agents, such as persulfates (in particular ammonium or alkali metal persulfates, and the like); chlorates and bromates (including inorganic or organic chlorates and/or bromates); reducing agents, such as sulfites and bisulfites (including inorganic and/or organic sulfites or bisulfites); oxalic acid and ascorbic acid, as well as the mixtures of two or more of these compounds.

The preferred initiators are water-soluble initiators. Sodium persulfate and azobisamidinopropane hydrochloride are in particular preferred.

In an alternative form, the polymerization can be initiated by irradiation using ultraviolet light. The amount of initiators used is generally an amount sufficient can produce initiation of the polymerization. The initiators are preferably present in an amount ranging from 0.001 to approximately 10% by weight with respect to the total weight of the monomers and are preferably in an amount of less than 0.5% by weight with respect to the total weight of the monomers, a preferred amount being situated in the range from 0.005 to 0.5% by weight with respect to the total weight of the monomers. The initiator is added to the polymerization mixture either continuously or noncontinuously.

When it is wished to obtain copolymers of high molecular mass, it is desirable to add fresh initiator during the polymerization reaction. The gradual or noncontinuous addition also makes possible a more efficient polymerization and a shorter reaction time. The polymerization is carried out under reaction conditions which are effective in polymerizing the monomers (a), the monomers (b) and optionally the monomers (c) under an atmosphere devoid of oxygen. The reaction is preferably carried out at a temperature ranging from approximately 30° to approximately 100° and preferably between 60° and 90° C. The atmosphere which is devoid of oxygen is maintained throughout the duration of the reaction, for example by maintaining a nitrogen flow throughout the reaction.

A particularly preferred copolymer is the following:

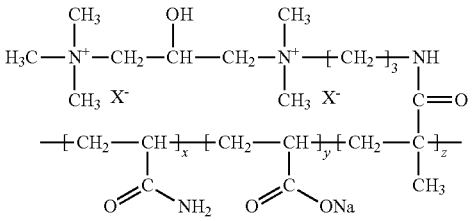

with x having a mean value of 0 to 50%, preferably of 0 to 30%, very particularly of 5 to 25%, y having a mean value of 10 to 95%, preferably of 20 to 70%, z having a mean value of 3 to 80%, preferably of 10 to 60%, and the y/z ratio preferably being of the order of 4/1 to 1/2, with x+y+z=100%, x, y and z representing the mol % of units derived from acrylamide, acrylic acid (sodium salt) and from Diquat respectively.

Other preferred polymers are as follows:

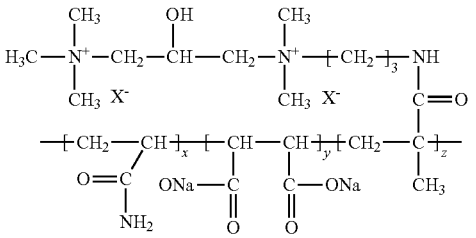

with x having a mean value of 0 to 50%, preferably of 0 to 30%, very particularly of 5 to 25%, y having a mean value of 10 to 95%, preferably of 20 to 70%, z having a mean value of 3 to 80%, preferably of 10 to 60%, and the y/z ratio preferably being of the order of 4/1 to 1/2;

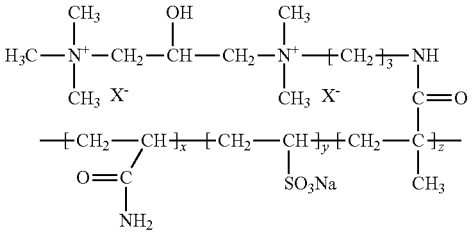

with x having a mean value of 0 to 50%, preferably of 0 to 30%, very particularly of 5 to 25%, y having a mean value of 10 to 95%, preferably of 20 to 70%, z having a mean value of 3 to 80%, preferably of 10 to 60%, and the y/z ratio preferably being of the order of 4/1 to 1/2;

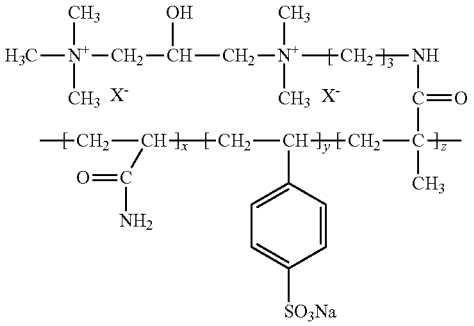

with x having a mean value of 0 to 50%, preferably of 0 to 30%, very particularly of 5 to 25%, y having a mean value of 10 to 95%, preferably of 20 to 70%, z having a mean value of 3 to 80%, preferably of 10 to 60%, and the y/z ratio preferably being of the order of 4/1 to 1/2;

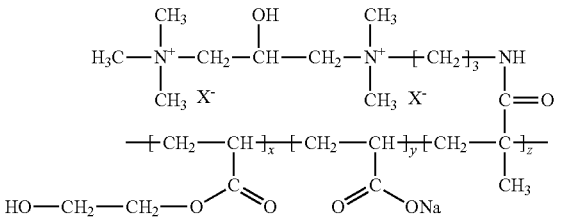

with x having a mean value of 0 to 50%, preferably of 0 to 30%, very particularly of 5 to 25%, y having a mean value of 10 to 95%, preferably of 20 to 70%, z having a mean value of 3 to 80%, preferably of 10 to 60%, and the y/z ratio preferably being of the order of 4/1 to 1/2;

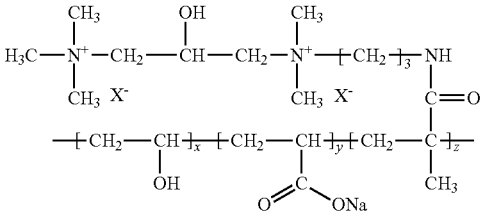

with x having a mean value of 0 to 50%, preferably of 0 to 30%, very particularly of 5 to 25%, y having a mean value of 10 to 95%, preferably of 20 to 70%, z having a mean value of 3 to 80%, preferably of 10 to 60%, and the y/z ratio preferably being of the order of 4/1 to 1/2;

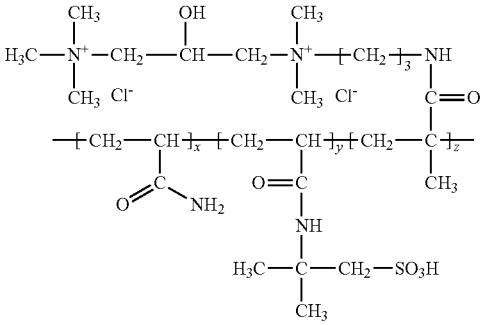

with x having a mean value of 0 to 50%, preferably of 0 to 30%, very particularly of 5 to 25%, y having a mean value of 10 to 95%, preferably of 20 to 70%, z having a mean value of 3 to 80%, preferably of 10 to 60%, and the y/z ratio preferably being of the order of 4/1 to 1/2.

The copolymers according to the invention can be used in particular in cleaning compositions for hard surfaces.

In the cleaning field, the copolymers of the invention are of use in conferring hydrophilization properties on surfaces to which they are applied, in particular in conferring persistent properties of resistance to stains or marks on surfaces.

In addition, they exhibit the property of preventing or of limiting the corrosion of glass, dishes and designs by washing media during repeated washing operations in an automatic dishwasher.

The term "persistent properties of resistance to marks or stains" is understood to mean that the treated surface retains these properties over time, including after subsequent contacts with water, whether rainwater, water from the supply system or rinsing water, which may or may not have rinsing products added.

Another subject-matter of the invention is the novel copolymers as defined above.

Said copolymer can be introduced into a cleaning or rinsing formulation intended for the treatment of hard surfaces at a content of between 0.0005% and 10%, preferably between 0.001 and 5%, by weight with respect to the total weight of the formulation, according to the concentration of active ingredients in the composition.

The composition according to the invention preferably comprises at least one surfactant. The latter is advantageously anionic and/or nonionic. It can also be cationic, amphoteric or zwitterionic.

The polymer of formula I/surfactant ratio by weight is advantageously between 1/2 and 1/100, advantageously 1/5 and 1/50.

Mention may in particular be made, among anionic surfactants, of soaps, such as salts of $C_8$-$C_{24}$ fatty acid, for example salts of fatty acids derived from copra and from tallow; alkylbenzenesulfonates, in particular alkylbenzenesulfonates with a linear $C_8$-$C_{13}$ alkyl, in which the alkyl group comprises from 10 to 16 carbon atoms, alcohol sulfates, ethoxylated alcohol suphates, hydroxyalkylsulfonates; alkyl sulfates and alkylsulfonates, in particular with a $C_{12}$-$C_{16}$ group, monoglyceride sulfates and condensates of fatty acid chloride with hydroxyalkylsulfonates.

Advantageous anionic surfactants are, in particular:

alkyl ester sulfonates of formula R—CH($SO_3$M)—COOR', where R represents a $C_{8-20}$, preferably $C_{10}$-$C_{16}$, alkyl radical, R' a $C_1$-$C_6$, preferably $C_1$-$C_3$, alkyl radical and M an alkali metal (sodium, potassium or lithium) cation, a substituted or unsubstituted ammonium (methyl-, dimethyl- trimethyl- or tetramethylammonium, dimethylpiperidinium, and the like) cation or a cation derived from an alkanolamine (monoethanolamine, diethanolamine, triethanolamine, and the like). Mention may very particularly be made of methyl ester sulfonates in which the R radical is a $C_{14}$-$C_{16}$ radical;

alkyl sulfates of formula R$OSO_3$M, where R represents a $C_6$-$C_{24}$, preferably $C_{10}$-$C_{18}$, alkyl or bydroxyalkyl radical, M representing a hydrogen atom or a cation with the same definition as above, and their ethoxylenated (EO) and/or propoxylenated (PO) derivatives, having on average from 0.5 to 30, preferably from 0.5 to 10, EO and/or PO units;

alkylamide sulfates of formula RCONHR'$OSO_3$M where R represents a $C_2$-$C_{22}$, preferably $C_6$-$C_{20}$, alkyl radical, R' a $C_2$-$C_3$ alkyl radical, M representing a hydrogen atom or a cation with the same definition as above, and their ethoxylenated (EO) and/or propoxylenated (PO) derivatives having on average from 0.5 to 60 EO and/or PO units;

salts of saturated or unsaturated $C_8$-$C_{24}$, preferably $C_{14}$-$C_{20}$, fatty acids, $C_9$-$C_{20}$ alkylbenzenesulfonates, primary or secondary $C_8$-$C_{22}$ alkylsulfonates, alkylglycerolsulfonates, the sulfonated polycarboxylic acids disclosed in GB-A-1,082,179, paraffin sulfonates, N-acyl-N-alkyltaurates, alkyl phosphates, isethionates, alkylsuccinamates, alkyl sulfosuccinates, sulfosuccinate monoesters or diesters, N-acyl-sarcosinates, alkylglycoside sulfates, or polyethoxycarboxylates, the cation being an alkali metal (sodium, potassium or lithium), a substituted or unsubstituted ammonium residue (methyl-, dimethyl-, trimethyl- or tetramethylammonium, dimethylpiperidinium, and the like) or a residue derived from an alkanolamine (monoethanolamine, diethanolamine, triethanolamine, and the like);

alkyl or alkylaryl phosphate esters, such as Rhodafac RA600, Rhodafac PA15 or Rhodafac PA23, sold by the company Rhodia.

Mention may in particular be made, among nonionic surfactants, of condensates of alkylene oxide, in particular of ethylene oxide, with alcohols, polyols, alkylphenols, fatty acid esters, fatty acid amides and fatty amines; amine oxides, sugar derivatives, such as alkylpolyglycosides or fatty acid esters of sugars, in particular sucrose monopalmitate; long-chain tertiary phosphine oxides; dialkyl sulfoxides; block copolymers of polyoxyethylene and of polyoxypropylene; polyalkoxylated sorbitan esters; fatty esters of sorbitan, poly(ethylene oxide)s and fatty acid amides modified so as to give them a hydrophobic nature (for example, fatty acid mono- and diethanolamides comprising from 10 to 18 carbon atoms).

Mention may particularly be made of polyoxyalkylenated (polyethoxyethylenated, polyoxypropylenated or polyoxybutylenated) alkylphenols in which the alkyl substituent is a $C_6$-$C_{12}$ alkyl substituent and which comprise from 5 to 25 oxyalkylene units; mention may be made, by way of example, of Triton X-45, X-114, X-100 or X-102, sold by Rohm & Haas Co.;

glucosamides, glucamides or glycerolamides;

polyoxyalkylenated $C_8$-$C_{22}$ aliphatic alcohols comprising from 1 to 25 oxyalkylene (oxyethylene, oxypropylene) units. Mention may be made, by way of example, of Tergitol 15-S-9 or Tergitol 24-L-6 NMW, sold by Union Carbide Corp., Neodol 45-9, Neodol 23-65, Neodol 45-7 or Neodol 45-4, sold by Shell Chemical Co., or Rhodasurf IDO60, Rhodasurf LA90 or Rhodasurf IT070, sold by the company Rbodia;

amine oxides, such as ($C_{10}$-$C_{18}$ alkyl)dimethylamine oxides or ($C_8$-$C_{22}$ alkoxy)ethyldihydroxyethylamine oxides;

the alkylpolyglycosides disclosed in U.S. Pat. No. 4,565,647;

$C_8$-$C_{20}$ fatty acid amides;

ethoxylated fatty acids;

ethoxylated amines.

Cationic surfactants are, in particular, alkylammonium salts of formula $$R^1R^2R^3R^4N^+X^-,$$

where $X^-$ represents a halide, $CH_3SO_4^-$ or $C_2H_5SO_4^-$ ion $R^1$ and $R^2$ are alike or different and represent a $C_1$-$C_{20}$ alkyl radical or an aryl or benzyl radical $R^3$ and $R^4$ are alike or different and represent a $C_1$-$C_{20}$ alkyl radical, an aryl or benzyl radical or an ethylene oxide and/or propylene oxide condensate $(CH_2CH_3O)_x$—$(CH_2CHCH_3O)_y$—H, where x and y range from 0 to 30 and are never simultaneously zero, such as cetyltrimethylammonium bromide, Rhodaquat® TFR, sold by the company Rhodia.

Examples of zwitterionic surfactants comprise aliphatic quaternary ammonium derivatives, in particular 3-(N,N-dimethyl-N-hexadecylammonio)propane-1-sulfonate and 3-(N,N-dimethyl-N-hexadecylammonio)-2-hydroxypropane-1-sulfonate.

Examples of amphoteric surfactants comprise betaines, sulfobetaines and carboxylates and sulfonates of fatty acids and of imidazole.

The following surfactants are preferred:

alkyl dimethyl betaines, alkyl amidopropyldimethyl betaines, alkyl dimethyl sulfobetaines or alkyl amidopropyldimethyl sulfobetaines, such as Mirataine CBS, sold by the company Rhodia, or the condensation products of fatty acids and of protein hydrolysates;

alkyl amphoacetates or alkyl amphodiacetates in which the alkyl group comprises from 6 to 20 carbon atoms;

amphoteric alkylpolyamine derivatives, such as Amphionic XL®, sold by Rbodia, or Ampholac 7T/X® and Ampholac 7C/X®, sold by Berol Nobel.

Additional examples of suitable surfactants are compounds generally used as surfactants denoted in the well-known texts "Surface Active Agents", volume I, by Schwartz and Perry, and "Surface Active Agents and Detergents", volume II, by Schwartz, Perry and Berth.

The surfactants can be present, if necessary, in a proportion of 0.005 to 60%, in particular of 0.5 to 40%, by weight, depending on the nature of the surfactant(s) and on the destination of the cleaning or rinsing composition.

Mention may be made, among the other common additives which are part of the formulation of detergent compositions, of:

In Particular for Washing in a Dishwasher

- organic builders (detergency adjuvants which improve the surface properties of surfactants) of the type:
  - organic phosphonates, such as those of the Dequest® range from Monsanto (in a proportion of 0 to 2% of the total weight of detergent composition, expressed as dry matter, in the case of a dishwasher composition);
  - polycarboxylic acids or their water-soluble salts and water-soluble salts of carboxylic polymers or copolymers, such as
    - polycarboxylate or hydroxypolycarboxylate ethers
    - polyacetic acids or their salts (nitriloacetic acid, N,N-dicarboxymethyl-2-aminopentanedioic acid, ethylenediaminetetraacetic acid, diethylenetriaminepentaacetic acid, ethylenediaminetetraacetates, nitrilotriacetates, such as Nervanaid NTA $Na_3$, sold by the company Rhodia, or N-(2-hydroxyethyl)nitrilodiacetates) (in a proportion of 0 to 10% of the total weight of the detergent composition, expressed as dry matter, in the case of a dishwasher composition);
    - ($C_5$-$C_{20}$ alkyl)succinic acid salts
    - polycarboxylic acetal esters
    - polyaspartic or polyglutamic acid salts
    - citric acid, gluconic acid or tartaric acid or their salts (in a proportion of 0 to 10% of the total weight of the detergent composition, expressed as dry matter, in the case of a dishwasher composition);
- inorganic builders (detergency adjuvants which improve the surface properties of surfactants) of the type:
  - alkali metal, ammonium or alkanolamine polyphosphates, such as Rhodiaphos HPA3.5, sold by the company Rhodia (in a proportion of 0 to 70% of the total weight of the detergent composition, expressed as dry matter, in the case of a dishwasher composition);
  - alkali metal pyrophosphates;
  - zeolites;
  - silicates (in an amount which can range up to approximately 50% of the total weight of said detergent composition, expressed as dry matter, in the case of a dishwasher composition);
  - alkali metal or alkaline earth metal borates, carbonates, bicarbonates or sesquicarbonates (in an amount which can range up to approximately 50% of the total weight of said detergent composition, expressed as dry matter, in the case of a dishwasher composition);
  - cogranules of alkali metal (sodium or potassium) silicate hydrates and of alkali metal (sodium or potassium) carbonates disclosed in EP-A-488,868, such as Nabion 15, sold by the company Rhodia (in an amount which can range up to approximately 50% of the total weight of said detergent composition, expressed as dry matter, in the case of a dishwasher composition);

(it being possible for the total amount of organic and/or inorganic builders to represent up to 90% of the total weight of said detergent composition, expressed as dry matter, in the case of a dishwasher composition);

- bleaching agents of the perborates or percarbonates type, which may or may not be combined with acetylated bleaching activators, such as N,N,N',N'-tetraacetylethylenediamine (TAED), or chlorinated products of the chloroisocyanurates type, or chlorinated products of the alkali metal hypochlorites type (in a proportion of 0 to 30% of the total weight of said detergent composition, expressed as dry matter, in the case of a dishwasher composition);
- auxiliary cleaning agents of the copolymers of acrylic acid and of maleic anbydride or acrylic acid homopolymers type (in a proportion of 0 to 10% of the total weight of said detergent composition, expressed as dry matter, in the case of a dishwasher composition);
- fillers of the sodium sulfate or sodium chloride type, in a proportion of 0 to 50% of the total weight of said composition, expressed as dry matter;
- various other additives, such as agents which influence the pH of the detergent composition, in particular basifying additives which are soluble in the washing medium (phosphates of alkali metals, carbonates, perborates or hydroxides or acidifying additives which are soluble in the washing medium (carboxylic or polycarboxylic acids, alkali metal bicarbonates and sesquicarbonates, phosphoric and polyphosphoric acids, sulfonic acids, and the like); or enzymes or fragrances, dyes or inhibitors of metal corrosion;

In Particular for Washing Dishes by Hand

- synthetic cationic polymers, such as Mirapol A550® or Mirapol A15®, sold by Rhodia, or Merquat 550®, sold by Calgon;
- polymers used to control the viscosity of the mixture and/or the stability of the foams formed during use, such as cellulose derivatives or guar derivatives (carboxymethylcellulose, hydroxyethylcellulose, hydroxypropylguar, carboxymethylguar, carboxymethylhydroxypropylguar, and the like);
- hydrotropic agents, such as short-chain $C_2$-$C_8$ alcohols, in particular ethanol, diols and glycols, such as diethylene glycol, dipropylene glycol, and the like;
- hydrating or moisturizing agents for the skin, such as glycerol or urea, or agents for protecting the skin, such as proteins or protein hydrolysates, or cationic polymers, such as cationic guar derivatives (Jaguar C13S®, Jaguar C162® or Hicare 1000®, sold by the company Rhodia.

The compositions according to the invention can be diluted (in water) from 1- to 10,000-fold, preferably from 1- to 1000-fold, before use.

The cleaning composition according to the invention is applied to the surface to be treated in an amount such that it allows, after rinsing, if necessary, and after drying, a deposit of copolymer according to the invention of 0.0001 to 1 $g/m^2$, preferably 0.001 to 0.1 $g/m^2$, of surface to be treated.

According to a particularly advantageous form, the cleaning composition according to the invention is employed for the treatment of glass surfaces, in particular windows. This treatment can be carried out by the various known techniques. Mention may be made in particular of the techniques for cleaning windows by spraying with a jet of water using devices of Karcher® type.

The amount of polymer introduced will generally be such that, during the use of the cleaning composition, after optional dilution, the concentration is between 0.001 g/l and 2 g/l, preferably from 0.005 g/l and 0.5 g/l.

Except when otherwise indicated, the proportions are shown by weight.

The composition for cleaning windows according to the invention comprises:

from 0.001 to 10%, preferably 0.005 to 3%, by weight of at least one water-soluble or water-dispersible copolymer as defined above;

from 0.005 to 20%, preferably from 0.5 to 10%, by weight of at least one nonionic surfactant (for example, an amine oxide) and/or anionic surfactant; and the remainder being formed of water and/or of various additives which are common in the field.

The formulations for cleaning windows comprising said polymer can also comprise:

from 0 to 10%, advantageously from 0.5 to 5%, of amphoteric surfactant, from 0 to 30%, advantageously from 0.5 to 15%, of solvent, such as alcohols, and the remainder being composed of water and of common additives (in particular fragrances).

The composition of the invention is also advantageous for cleaning dishes by hand or in an automatic device. In the latter case, said copolymer can be present either in the detergent formula used in the washing cycle or in the rinsing liquid.

Detergent formulations for washing dishes in automatic dishwashers advantageously comprise from 0.1 to 5%, preferably 0.2 to 3%, by weight of water-soluble or water-dispersible copolymer with respect to the total weight of dry matter of the composition.

The detergent compositions for dishwashers also comprise at least one surfactant, preferably a nonionic surfactant, in an amount ranging from 0.2 to 10%, preferably from 0.5 to 5%, of the weight of said detergent composition, expressed as dry matter, the remainder being composed of various additives and of fillers, as already mentioned above. These formulae generally comprise 30 to 95% of a builder, which builders are chosen from silicates, phosphates or carbonates. It also comprise an oxidizing system introduced at a content of between 3 and 25%.

It has been discovered, surprisingly, that the use of a copolymer according to the invention in a composition for washing in a dishwasher protects the glass and the dishes against corrosion by the washing medium during repeated washing operations.

Formulations for rinsing dishes in an automatic dishwasher advantageously comprise from 0.02 to 10%, preferably from 0.1 to 5%, by weight of copolymer with respect to the total weight of the composition.

They also comprise from 0.2 to 15%, preferably 0.5 to 5%, by weight with respect to the total weight of said composition of a surfactant, preferably a nonionic surfactant or a mixture of nonionic and anionic surfactant.

Mention may be made, among preferred nonionic surfactants, of surfactants of the following type: polyoxyethylenated $C_6$-$C_{12}$ alkylpbenols, polyoxyethylenated and/or polyoxypropylenated $C_8$-$C_{22}$ aliphatic alcohols, ethylene oxide/propylene oxide block copolymers, optionally polyoxyethylenated carboxamides, and the like.

They also comprise from 0 to 40%, preferably from 3 to 30%, by weight with respect to the total weight of the composition of a calcium-sequestering organic acid, preferably citric acid.

They can also comprise an auxiliary agent of copolymer of acrylic acid and of maleic anhydride or acrylic acid homopolymers type, in a proportion of 0 to 15%, preferably 0 to 10%, by weight with respect to the total weight of said composition.

Another subject-matter of the invention is a cleaning composition for washing up dishes by hand.

Preferred detergent formulations of this type comprise from 0.1 to 5 parts by weight of copolymer of the invention per 100 parts by weight of said composition and comprise from 3 to 50, preferably from 10 to 40, parts by weight of at least one surfactant, preferably an anionic surfactant, chosen in particular from sulfates of saturated $C_5$-$C_{24}$, preferably $C_{10}$-$C_{16}$, aliphatic alcohols, optionally condensed with approximately 0.5 to 30, preferably 0.5 to 5, particularly 0.5 to 3, mol of ethylene oxide, in acid form or in the form of a salt, in particular an alkali metal (sodium) or alkaline earth metal (calcium, magnesium) salt, and the like.

The present invention is aimed more particularly at lathering liquid aqueous detergent formulations for washing up dishes by hand.

Said formulations can also comprise other additives, in particular other surfactants, such as:

nonionic surfactants, such as amine oxides, alkylglucamides, oxyalkylenated fatty alcohol derivatives, alkylamides or alkanolamides, amphoteric surfactants or zwitterionic surfactants, bactericides or disinfectants, such as triclosan, synthetic cationic polymers, polymers for controlling the viscosity of the mixture and/or the stability of the foams formed during use, hydrotropic agents, hydrating or moisturizing agents or agents for protecting the skin, dyes, fragrances, preservatives, and the like, as already mentioned above.

Another subject-matter of the invention is a cleaning composition for the external cleaning, in particular of the bodywork, of motor vehicles.

In this case also, the copolymer according to the invention can be present either in a detergent formula used for the washing operation or in a rinsing product.

The cleaning composition for motor vehicles advantageously comprises from 0.05 to 5% by weight of copolymer according to the invention with respect to the total weight of said composition, as well as:

nonionic surfactants (in a proportion of from 0 to 30%, preferably of 0.5 to 15%, of the formulation), amphoteric and/or zwitterionic surfactants (in a proportion of 0 to 30%, preferably of 0.5 to 15%, of the formulation), cationic surfactants (in a proportion of 0 to 30%, preferably of 0.5 to 15%, of the formulation);

anionic surfactants (in a proportion of 0 to 30%, preferably of 0.5 to 15%, of the formulation); organic or inorganic detergency adjuvants (builders), hydrotropic agents, fillers, pH modifiers, and the like.

The minimum amount of surfactant present in of type of composition can be at least 1% of the formulation).

The composition of the invention is also particularly suitable for cleaning hard surfaces other than those described above, in particular ceramics (tiling, baths, sinks, and the like).

In this case, the cleaning formulation advantageously comprises from 0.02 to 5% by weight of copolymer with respect to the total weight of said composition, as well as at least one surfactant.

Preference is given, as surfactants, to nonionic surfactants, in particular the compounds produced by condensation of alkylene oxide groups as described above, which are of hydrophilic nature, with a hydrophobic organic compound, which can be of aliphatic or alkylaromatic nature.

The length of the hydrophilic chain or of the polyoxyalkylene radical condensed with any hydrophobic group can be readily adjusted in order to obtain a water-soluble compound which has the desired degree of hydrophilic/hydrophobic balance (HBL).

The amount of nonionic surfactants in the composition of the invention is generally from 0 to 30% by weight, preferably from 0 to 20% by weight.

An anionic surfactant can optionally be present in an amount of 0 to 30%, advantageously 0 to 20%, by weight.

It is also possible, but not obligatory, to add amphoteric, cationic or zwitterionic detergents to the composition of the present invention for cleaning hard surfaces.

The total amount of surfactants employed in this type of composition is generally between 1.5 and 50%, preferably between 5 and 30%, by weight and more particularly between 10 and 20% by weight, with respect to the total weight of the composition.

The composition for cleaning hard surfaces of the present invention can also comprise other minor ingredients which are cleaning additives.

For example, the composition can comprise organic or inorganic detergency adjuvants (builders) as mentioned above.

In general, the detergency adjuvant is employed in an amount of between 0.1 and 25% by weight with respect to the total weight of the composition.

Another optional ingredient in the compositions for cleaning hard surfaces of the invention is a foam modifier, which can be employed in compositions which have a tendency to produce an excess of lather during their use. An example of these materials are soaps. Soaps are fatty acid salts and comprise alkali metal, in particular the sodium or potassium salts, ammonium and alkanolammonium soaps of higher fatty acids comprising approximately from 8 to 24 carbon atoms and preferably from approximately 10 to approximately 20 carbon atoms. Particularly useful are the mono-, di- and triethanolamine salts, the sodium and potassium salts or of mixtures of fatty acids derived from coconut oil and from ground walnut oil. The amount of soap can be at least 0.005% by weight, preferably from 0.5% to 2% by weight, with respect to the total weight of the composition. Additional examples of foam modifiers are organic solvents, hydrophobic silica, silicone oil and hydrocarbons.

In addition to the ingredients mentioned above, the compositions for cleaning hard surfaces of the present invention can also comprise other optional ingredients, such as pH modifiers, dyes, optical brighteners, agents for suspending material from dirty marks, detergent enzymes, compatible bleaching agents, agents for controlling gel formation, freezing-thawing stabilizers, bactericides, preservatives, solvents, fungicides, insect repellents, hydrotropic agents, fragrances, opacifiers or pearlescent agents.

The composition of the invention can also be employed by cleaning toilet bowls.

One composition which is particularly suitable for this purpose comprises from 0.05 to 5% by weight of copolymer according to the invention.

The composition for cleaning toilet bowls according to the invention also comprises an acid cleaning agent which can comprise an inorganic acid, such as phosphoric acid, sulfamic acid, hydrochloric acid, hydrofluoric acid, sulfuric acid, nitric acid or chromic acid and mixtures thereof, or an organic acid, in particular acetic acid, hydroxyacetic acid, adipic acid, citric acid, formic acid, fumaric acid, gluconic acid, glutaric acid, glycolic acid, malic acid, maleic acid, lactic acid, malonic acid, oxalic acid, succinic acid and tartaric acid and mixtures thereof, acid salts, such as sodium bisulfate, and mixtures thereof.

The amount of acid ingredients is preferably between 0.1 to approximately 40% and preferably between 0.5 and approximately 15% by weight, with respect to the total weight of the composition.

The preferred amount depends on the type of acid cleaning agent used: for example, with sulfamic acid. It is between approximately 0.2 and approximately 1%, with hydrochloric acid between approximately 1 and approximately 5%, with citric acid between approximately 2 and approximately 10%, with formic acid between approximately 5 and approximately 15% and with phosphoric acid between approximately 5 and approximately 30%, by weight.

The amount of acid agent is generally such that the final pH of the composition is from approximately 0.5 to about 4, preferably 1 to 3.

The composition for cleaning toilet bowls also comprises from 0.5 to 10% by weight of a surfactant, so as to contribute towards removing dirty marks or so as to give foaming or wetting characteristics, or in order to increase the cleaning efficacy of the composition. The surfactant is preferably an anionic or nonionic surfactant.

Cationic surfactants can also be added to the composition for cleaning toilet bowls according to the invention in order to provide germicidal properties. A person skilled in the art will see that amphoteric surfactants can also be used. Mixtures of various surfactants can be employed, if so desired.

The composition for cleaning toilet bowls according to the invention can also comprise a thickener of gum type, in particular a xanthan gum, introduced at a concentration of 0.1 to 3%, as well as one or more of the following minor ingredients: a preservative intended to prevent the growth of microorganisms in the product, a dye, a fragrance and/or an abrasive.

The composition according to the invention is also suitable for rinsing shower walls.

The aqueous compositions for rinsing shower walls comprise from 0.02% to 5% by weight, advantageously from 0.05 to 1%, of the copolymer of the invention.

The other main active components of the aqueous compositions for rinsing showers of the present invention are at least one surfactant, present in an amount ranging from 0.5 to 5% by weight, and optionally a metal-chelating agent, present in an amount ranging from 0.01 to 5% by weight.

The preferred metal-chelating agents are ethylenediaminetetraacetic acid (EDTA) and its analogues.

The aqueous rinsing compositions for showers advantageously comprise water with, optionally, a major proportion of at least one lower alcohol and a minor proportion of additives (between approximately 0.1 and approximately 5% by weight, more advantageously between approximately 0.5% and approximately 3% by weight and even more preferably between approximately 1% and approximately 2% by weight).

Certain surfactants which can be used in this type of application are disclosed in U.S. Pat. Nos. 5,536,452 and 5,587,022, the content of which is incorporated in the present description by way of reference.

Preferred surfactants are polyethoxylated fatty esters, for example polyethoxylated sorbitan monooleates and polyethoxylated castor oil. Specific examples of such surfactants are the condensation products of 20 mol of ethylene oxide and of sorbitan monooleate (sold by Rhodia Inc. under the name Alkamuls PSMO-20® with an HLB of 15.0) and of 30 or 40 mol of ethylene oxide and of castor oil (sold by Rhodia Inc. under the name Alkamuls EL-620® (HLB of 12.0) and EL-719® (HLB of 13.6), respectively). The degree of ethoxylation is preferably sufficient to obtain a surfactant with an HLB of greater than 13. Other surfactants, such as alkylpolyglucosides, are also well suited to these compositions.

The composition according to the invention can also be employed for cleanings glass-ceramic plates.

Advantageously, the formulations for cleanings glass-ceramic plates of the invention comprise:

0.1 to 5% by weight of the copolymer of the invention;

0.1 to 1% by weight of a thickener, such as a xanthan gum;

10 to 40% by weight of an abrasive agent, such as calcium carbonate or silica;

0 to 7% by weight of a glycol, such as butyl diglycol;

1 to 10% by weight of a nonionic surfactant;

0.1 to 3% by weight of a copolymer of silicone type; and optionally basifying agents or sequestering agents.

Another subject-matter of the invention is an aqueous biocidal cleaning composition for the treatment of hard surfaces comprising:

at least one water-soluble or water-dispersible copolymer according to the invention at least one cationic, amphoteric or aminated, preferably cationic, biocide and optionally at least one nonionic, amphoteric or zwitterionic, preferably nonionic, surfactant.

The biocide is preferably present in the aqueous biocidal cleaning composition at a concentration of the order of 0.1% to 20% by weight, preferably of the order of 0.5% to 5% by weight.

The copolymer according to the invention can be present in the aqueous biocidal cleaning composition at a concentration of the order of 0.01% to 20% by weight, preferably of the order of 0.05 to 5% by weight. Said copolymer does not in itself generally have a biocidal activity.

Mention may be made, among biocidal agents which may be present, of:

quaternary monoammonium salts of formulae $$R^1R^2R^3R^4N^+X^-$$

where $R^1$ represents a benzyl group optionally substituted by a chlorine atom or a $C_1$-$C_4$ alkylbenzyl group, $R^2$ represents a $C_8$-$C_{24}$ alkyl group, $R^3$ and $R^4$, which are alike or different, represent a $C_1$-$C_4$ alkyl or hydroxyalkyl group, $X^-$ is a solubilizing anion, such as halide (for example, chloride, bromide or iodide), sulfate or methyl sulfate;

$$R^{1'}R^{2'}R^{3'}R^{4'}N^+X^-$$

where $R^{1'}$ and $R^{2'}$, which are alike or different, represent a $C_8$-$C_{24}$ alkyl group, $R^{3'}$ and $R^{4'}$, which are alike or different, represent a $C_1$-$C_4$ alkyl group, $X^-$ is a solubilizing anion, such as halide (for example, chloride, bromide or iodide), sulfate or methyl sulfate;

$$R^{1''}R^{2''}R^{3''}R^{4''}N^+X^-$$

where $R^{1'}$ represents a $C_8$-$C_{24}$ alkyl group, $R^{2''}$, $R^{3''}$ and $R^{4''}$, which are alike or different, represent a $C_1$-$C_4$ alkyl group, $X^-$ is a solubilizing anion, such as halide (for example, chloride, bromide or iodide), sulfate or methyl sulfate; in particular:

cocoalkylbenzyldimethylammonium, ($C_{12}$-$C_{14}$ alkyl)benzyldimethylammonium, cocoalkykdichlorobenzyl) dimethylammonium, tetradecylbenzyldimethylammonium, didecyldimethylammonium or dioctyldimethylammonium chlorides, myristyltrimethylammonium or cetyltrimethylammonium bromides;

monoquaternary heterocyclic amine salts, such as laurylpyridinium, cetylpyridinium or ($C_{12}$-$C_{14}$ alkyl)benzylimidazolium chlorides;

(fatty alkyl)triphenylphosphonium salts, such as myristyltriphenylphosphonium bromide;

amphoteric biocides, such as N-[N'-($C_8$-$C_{18}$ alkyl)-3-aminopropyl]glycine, N-[N'-(N''-($C_8$-$C_{18}$ alkyl)-2-aminoethyl)-2-aminoethyl]glycine or N,N-bis[N'-($C_8$-$C_{18}$ alkyl)-2-aminoethyl]glycine derivatives, such as (dodecyl)(aminopropyl)glycine or (dodecyl)(diethylenediamine)glycine;

amines, such as N-(3-aminopropyl)-N-dodecyl-1,3-propanediamine.

Mention may in particular be made, among possible surfactants, of:

nonionic surfactants, such as ethylene oxide/propylene oxide block polymers, polyethoxylated sorbitan esters, sorbitan fatty esters, ethoxylated fatty esters (comprising from 1 to 25 ethylene oxide units), polyethoxylated $C_8$-$C_{22}$ alcohols (comprising from 1 to 25 ethylene oxide units), polyethoxylated $C_6$-$C_{22}$ alkylphenols (comprising from 5 to 25 ethylene oxide units), alkylpolyglycosides or amine oxides (such as ($C_{10}$-$C_{18}$ alkyl)dimethylamine oxides or ($C_8$-$C_{22}$ alkoxy) ethyldihydroxyethylamine oxides)

amphoteric or zwitterionic surfactants, such as $C_6$-$C_{20}$ alkyl amphoacetates or amphodiacetates (such as cocoamphoacetates), $C_{10}$-$C_{18}$ alkyl dimethyl betaines, $C_{10}$-$C_{18}$ alkyl amidopropyldimethyl betaines, $C_{10}$-$C_{18}$ alkyl dimethyl sulfobetaines or $C_{10}$-$C_{18}$ alkyl amidopropyldimethyl sulfobetaines.

These can be present in a proportion of 1 to 25%, preferably of the order of 2 to 10%, by weight of the aqueous biocidal cleaning composition.

According to the invention, in addition to the biocide and the copolymer according to the invention, which are the main constituents of the aqueous biocidal system of the invention, it is advantageously possible for other constituents to be present, such as chelating agents (for example aminocarboxylates (ethylenediaminetetraacetates, nitrilotriacetates or N,N-bis(carboxymethyl)glutamates or citrates), alcohols (ethanol, isopropanol or glycols), detergency adjuvants (phosphates or silicates), dyes, fragrances, and the like.

Said biocidal cleaning composition can be employed for disinfecting floors, walls, work surfaces, equipment, furniture, instruments, and the like in industry, the food processing field, the domestic sphere (kitchens, bathrooms, and the like) and communally.

Mention may be made, among the surfaces which can be treated, of those made of ceramic, glass, poly(vinyl chloride), formica or other hard organic polymer, stainless steel, aluminium, wood, and the like.

The cleaning and disinfecting operation consists in applying said biocidal cleaning composition, optionally diluted from 1- to 1000-fold, preferably from 1- to 100-fold, to the hard surface to be treated.

The amount of biocidal system which can be favorably employed is that corresponding to a deposition of 0.01 to 10 g, preferably of 0.1 to 1 g, of biocide per $m^2$ of surface and to a deposition of 0.001 to 2 g, preferably of 0.01 to 0.5 g, of copolymer of the invention per $m^2$ of surface.

Mention may be made, among the microorganisms whose proliferation can be controlled by employing the biocidal cleaning composition of the invention, of Gram negative bacteria, such as: Pseudomonas aeruginosa; Escherichia coli; Proteus mirabilis Gram positive bacteria, such as: Staphylococcus aureus; Streptococcus faecium other bacteria which are dangerous in food, such as: Salmonella typhimurium; Listeria monocytogenes; Campylobacter jejuni; Yersinia enterocolitica yeasts, such as: Saccharomyces cerevisiae; Candida albicans fungi, such as: Aspergillus niger; Fusarium solani; Penicillium chrysogenum algae, such as: Chlorella saccharophilia; Chlorella emersonii; Chlorella vulgaris; Chlamydomonas eugametos.

The biocidal system of the invention is very particularly effective against the Gram negative microorganism Pseudomonas aeroginosa, the Gram positive microorganism Staphylococcus aureus or the fungus Aspergillus niger.

Another subject-matter of the invention is the use of a water-soluble or water-dispersible copolymer as defined above in the cleaning or rinsing of a hard surface, in particular in order to confer hydrophilization properties on a hard surface.

The hydrophilization properties conferred by the copolymer of the invention are in particular properties of "resistance to running", "resistance to condensation", "resistance to stains" and/or "resistance to marks".

A subject-matter of the invention is likewise a process for improving the hydrophilicity of a hard surface by treating said surface using a cleaning composition comprising at least one copolymer according to the invention.

Another subject-matter of the invention is the use of a copolymer as defined above for decreasing the rate of drying of a hard surface to which the copolymer is applied.

Another subject-matter of the invention is the use, in a detergent composition for washing dishes in an automatic dishwasher, of a copolymer according to the invention as agent for eliminating or decreasing the corrosion of the glass and of the designs present on the glass or the dishes during repeated washing operations.

Finally, a subject-matter of the invention is a process for protecting the glass, dishes and designs by washing the glass and dishes in an automatic dishwasher using a cleaning composition comprising at least one copolymer according to the invention.

The examples below are intended to illustrate the invention.

EXAMPLES 1 TO 5

Preparation of the copolymers according to the invention of formula:

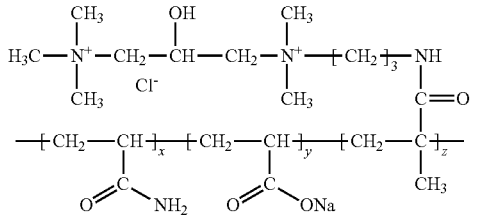

| Reference | x (mol %) | y (mol %) | z (mol %) | Viscosity of the solution in cps dry matter % | pH |
|---|---|---|---|---|---|
| Polymer 1 | 20 | 40 | 40 | 29,500 cps 20.5% | 2.2 to 10% of dry matter |

-continued

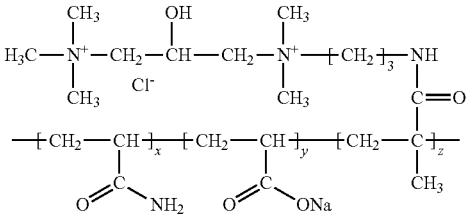

| Reference | x (mol %) | y (mol %) | z (mol %) | Viscosity of the solution in cps dry matter % | pH |
|---|---|---|---|---|---|
| Polymer 2 | 0 | 10 | 10 | 840 cps 20.5% | 1.7 to 20.5% of dry matter |
| Polymer 3 | 0 | 20 | 10 | 8700 cps 20.0% | 1.6 to 20.0% of dry matter |
| Polymer 4 | 0 | 40 | 10 | 37,250 cps 17% | 3.5 to 37% of dry matter |
| Polymer 5 | 20 | 40 | 20 | | |

The following ingredients are added to a 1 liter reactor:

| | Polymer 1 | Polymer 2 | Polymer 3 | Polymer 4 | Polymer 5 |
|---|---|---|---|---|---|
| Demineralized water | 633 | 707 | 632.5 | 737 | 633 |
| 52% Acrylamide | 29.3 | 0 | 0 | 0 | 29.3 |
| Acrylic acid | 30.9 | 33.5 | 55.5 | 89.1 | 30.9 |
| 65% Diquat monomer | 236.7 | 256.2 | 212.3 | 170.6 | 118.35 |
| Versene 100 (EDTA from Dow Chemical) | 0.2 | 0.2 | 0.2 | 0.2 | 0.2 |

The mixture obtained is heated gently to 75° C. at a pH of approximately 2.6 under a gentle nitrogen flow. After 30 minutes, when the temperature reaches 75° C., an initiator solution based on sodium persulfate (0.1 g in 1.0 g of demineralized water) is added to the reactor in a single step. Cooling is necessary in order to keep the temperature at 75° C. and the mixture becomes viscous after approximately 45 minutes. Two additional portions of initiating solution based on persulfate are added after reacting for one and two hours respectively. The reaction mixture is subsequently heated to a temperature of 85° C. and maintained at this temperature for an additional two hours before being cooled to 25° C. The viscosity of the resulting solution of Polymer 1 is approximately 29,500 cps with a total content of solids of approximately 20.5%. The pH of the 10% solution is approximately 2.2. The residual acrylamide is less than 0.1% by weight.

EXAMPLE 6

Preparation of the polymer of formula:

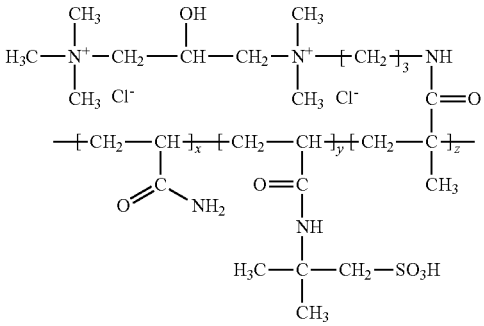

with x=20, y=40, z=40 (Polymer 6).

The process is the same as that of Examples 1 to 5, apart from the fact that the acrylic acid is replaced with N-(1-sulfo-2-isobutyl)acrylamide.

EXAMPLES 7 TO 9

Cleaning Formulations for Cleaning Windows

The compositions of three cleaning formulations used for cleaning windows are recorded in the table below:

| Components | Formulations (by weight) Example 7 | Example 8 | Example 9 |
|---|---|---|---|
| Isopropyl alcohol | 7 | 7 | 15 |
| Ethoxylated (7 EO) fatty (C12) alcohol | 0 | 0 | 3 |
| Sodium dodecylbenzenesulfonate | 0.5 | 0.5 | 0 |
| Ammonium hydroxide | 0.3 | 0.3 | 0.3 |
| Dipropylene glycol monomethyl ether | 0.25 | 0.25 | 0.5 |
| Copolymer No. 1 described in the invention | 0.05 | 0.5 | 1 |
| Water | q.s. for 100 | q.s. for 100 | q.s. for 100 |

The formulations of Examples 7 to 9 are used as is by spraying at the surface of the windows to be cleaned (6 to 8 sprayings, i.e. 3 to 5 g of formulation per $m^2$ of surface.

EXAMPLES 10 TO 11

Cleaning Formulations for Hard Surfaces, Such as Tilings, Ceramics, Sinks or Baths Cleaning formulations for cleaning hard surfaces are given in the table below.

| Components | Formulations (by weight) Example 10 | Example 11 |
|---|---|---|
| Ethoxylated (7 EO) fatty (C12) alcohol | 6 | 8 |
| Sodium (C12)alkanesulfonate | 3 | 2 |
| Sodium hydroxide | such that pH = 10.4 | such that pH = 10.4 |

-continued

| Components | Formulations (by weight) Example 10 | Example 11 |
|---|---|---|
| Copolymer No. 2 described in the invention | 1 | 0.5 |
| Water | q.s. for 100 | q.s. for 100 |

The formulations of Examples 10 and 11 are diluted before use in a proportion of 10 g of formulation in 1 liter of water.

EXAMPLES 12 TO 14

Detergent Formulae for an Automatic Dishwasher

A base detergent formula is prepared from the compounds given in the table below:

| Compounds | weight % |
|---|---|
| Granulated sodium tripolyphosphate | 45 |
| Sodium carbonate | 4 |
| Granulated sodium disilicate | 26 |
| Sodium perborate monohydrate | 7 |
| TAED | 2 |
| Sodium sulfate | 16 |

Three copolymers according to the invention (Copolymer No. 2, 3 and 4 above) or two other polymers (Copolymers No. 7 and No. 8 below), by way of comparison, are added to these compositions.

Copolymer 7:

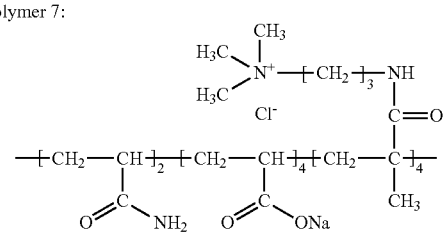

Copolymer 8:

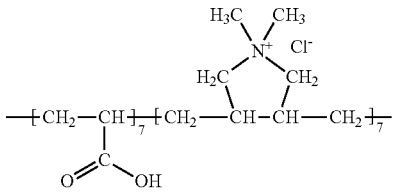

Glass Corrosion Test

This simplified glass corrosion test reproduces certain washing conditions of dishwashers, in particular washing, rinsing and drying cycles.

Nature of the Glass

The glass used is composed of microscope slides with dimensions of 2.5×7.5 cm cleaned beforehand with ethanol, the composition of which slides, given below, is similar to that of table glasses:

Si: 21-43% by weight
Ca: 2.8-5.8% by weight
Mg: 1.6-3.4% by weight
Na: 6.8-14.2% by weight
Al: 0.3-0.7% by weight Procedure 200 ml of an aqueous washing solution comprising 6 g/l of product to be tested are introduced into a container. The container is introduced into and held in an oven at 65° C. for 1 hour.

A glass slide is completely immersed in this container in the inclined position. The container is then closed and then placed in an oven at 65° C. The slide is taken out of the container after 72 hours, rinsed twice on each face with deionized water using a wash bottle, touched lightly with the finger in order to remove the film which may have been formed and dried in the surrounding air for 2 hours.

At the end of the test, the slide is weighed after cooling to room temperature and the relative mass variation (as %×1000) is calculated. The test is repeated another time for confirmation of the results.

The corrosion visible to the eye is evaluated with respect to a reference slide which has not been subjected to the test.

The evaluation of corrosion is carried out visually by nine trained people with a scale ranging from 1 to 5 points, the glasses in the fresh state being taken as reference.

The points are distributed as follows:

1 point corresponds to a perfect state.

2 points correspond to damage which is scarcely visible (colorless or colored marks on design-free glasses; matting of the design of the glass).

3 points correspond to very marked damage which is spontaneously visible (design-free glasses covered all over with colored or colorless marks, optionally with the presence of local defects; the glass designs are matt, with fading of the colors).

4 points correspond to very significant damage (the design-free glasses also exhibit broad white stains; the glass designs have partially disappeared).

5 points correspond to completely debased surfaces (the whole surface is damaged; the designs have disappeared).

Finally, the pH of the solutions is measured at room temperature before the immersion of the slide and at the end of the experiment.

This simplified test makes it possible to rapidly reproduce the various types of glass corrosion obtained by the repeated washing in a dishwasher, the sequence of the washing-rinsing-drying cycles, under concentration and temperature conditions similar to those used in dishwashers.

The results of the tests are given in the table below:

| Example | Example 12 | Example 13 | Example 14 | Example 15 | Examplc 16 | Example 17 |
|---|---|---|---|---|---|---|
| Composition | Base formula: 98% Sodium sulfate: 2% | Base formula: 98% Polymer 7: 2% | Base formula: 98% Polymer 7: 2% | Base formula: 98% Polymer 2: 2% | Base formula: 98% Polymer 3: 2% | Base formula: 98% Polymer 4: 2% |
| Final pH | 10.33 | 10.35 | 10.35 | 10.32 | 10.33 | 10.35 |
| Loss in mass $10^{-3}$ % | 213 | 235 | 210 | 57 | 60 | 90 |
| Visual assessment | 4.5 | 4.5 | 4.5 | 1 | 1 | 15 |

Examples 12, 13 and 14 are given by way of comparison.

Examples 15, 16 and 17 show that the polymers of the invention introduce efficient protection of the glass against corrosion, which is not obtained with Examples 12, 13 and 14.

EXAMPLES 15 TO 17

Formulations for rinsing dishes in an automatic dishwasher

| Formulation | Example 15 | Example 16 | Example 17 |
|---|---|---|---|
| C13-3PO-7EO Nonionic surfactant (EO/PO linear fatty alcohol) | 12 | 12 | 12 |
| Citric acid | 3 | 3 | 3 |
| Polymer | Polymer 3 (2%) | Polymer 3 (2%) | Polymer 5 (256) |
| Water | q.s. for to 100 | q.s. for to 100 | q.s. for to 100 |

EXAMPLES 18 TO 19

Formulation for washing dishes by hand

| Formulation | Example 18 | Example 19 |
|---|---|---|
| Sodium (C14)alkylsulfonate | 24 | 12 |
| Ethoxylated C12 fatty alcohol - 1.5 EO | 5 | 3 |
| Ethoxylated C10 fatty alcohol - 7 EO | 4 | 4 |
| Polymer | Polymer 4 (2%) | Polymer 6 (2%) |
| Water | q.s. for to 100 | q.s. for to 100 |

EXAMPLES 20 AND 21

Detergent formulations for cleaning hard surfaces (tilings, sinks, baths)

| Formulation | Example 20 | Example 21 |
|---|---|---|
| Sodium (C12)alkylsulfonate | 24 | 12 |
| Ethoxylated C12 fatty alcohol - 6 EO | 5 | 3 |

-continued

| Detergent formulations for cleaning hard surfaces (tilings, sinks, baths) | | |
|---|---|---|
| Formulation | Example 20 | Example 21 |
| Ethanol | 4 | 4 |
| Polymer | Polymer 3 (2%) | Polymer 5 (2%) |
| Water | q.s. for to 100 | q.s. for to 100 |

EXAMPLES 22 TO 25

| Detergent formulae for an automatic dishwasher | | | | |
|---|---|---|---|---|
| Formulation example | Example 22 | Example 23 | Example 24 | Example 25 |
| Sodium tripolyphosphate | 0 | 0 | 60 | 35 |
| Sodium carbonate | 35 | 30 | 0 | 20 |
| Sodium disilicate | 20 | 15 | 23 | 10 |
| Sodium citrate | 20 | 15 | 0 | 0 |
| Sodium sulfate | 0 | 20 | 0 | 19 |
| Poly(sodium acrylate) CP5 from BASF | 6 | 5 | 0 | 0 |
| Plurafac LF 403 | 2 | 1 | 2 | 2 |
| Bleaching system (perborate.1$H_2O$ + TAED**) | 12 | 10 | 10 | 10 |
| Other additives (including benzatriazole, enzymes, fragrance) | 3 | 3 | 3 | 3 |
| Polymer 3 | 2 | 1 | 2 | 1 |

EXAMPLES 26 TO 28

| Biocidal formulations | | | |
|---|---|---|---|
| | Example 26 | Example 27 | Example 28 |
| Nonionic surfactant (C10 alcohol with 6 ethylene oxide units | 5% | 5% | 5% |
| Rhodaquat RP50 biocide % of active material | 1.5% | 1.5% | 1.5% |
| Polymer % of active material | Polymer 1 0.15 or 0.2% | Polymer 3 0.5% | Polymer 4 0.2% |
| Water | | | |

The biocide Rhodaquat RP50 is an aqueous solution of (C12-C14 alkyl)benzyldimethylammonium chloride with an active material content of 50% sold by Rbodia.

The Formulation of Example 26 is Tested on a White Ceramic Tile According to the Following Protocol:

1. 3 g of dilute aqueous biocidal solution are added to the surface of the ceramic tile (5 cm×5 cm) sterilized beforehand by cleaning with isopropyl alcohol. The tile is dried at 45° C. in an oven.

2. The surface of the tile is positioned vertically and is sprayed with one gram of water using a hand sprayer. This corresponds to a washing operation without mechanical action. Between 0 and 15 washing operations are thus carried out before drying at 45° C.

3. 0.25 ml of an aqueous medium comprising approximately $10^8$ CFU/ml of Gram negative bacterium, Pseudomonas aeruginosa, is added and is spread over the pretreated hard surface.

4. The tile is left at room temperature for 3 hours, in order to allow the biocide to migrate from the surface of the polymer and to kill the surface bacteria.

5. The tile is dried at 37° C. for at least 30 minutes.

6. The surviving microorganisms are recovered by using a sterile cottonwool pad moistened beforehand with a neutralizing solution. The entire surface is carefully cleaned by wiping 4 times in all directions.

7. The pad is introduced into 9 ml of neutralizing medium; the volume is adjusted to 10 ml with water. The bacterial suspension is transferred onto Nutrient Agar in Petri dishes by successive dilutions by a factor 10.

8. The dishes are incubated at 37° C. for 48 hours and the surviving microorganisms are counted.

The neutralizing medium comprises 3% of Tween 80 polysorbate and 2% of soybean lecithin.

A control test is performed by carrying out Stages 1. to 7. on the surface of a white ceramic tile (5 cm×5 cm) which has been sterilized beforehand but which has not been treated with the biocidal system.

The $\log_{10}$ for reduction of the number of bacteria is calculated as follows:

$$\log_{10} \text{ for reduction} = \log_{10} N/n$$

N being the number of surviving bacteria (in CFU/ml) in the control test n being the number of surviving bacteria (in CFU/ml) in the test employing the biocidal system.

Results

The results of the above test appear in the following table.

| Example | Polymer | Log10 for reduction after 0 washing operation | Log10 for reduction after 15 washing operation |
|---|---|---|---|
| 26 | Polymer 1: 0.15% | 6 | 6 |
| | Without polymer | 6 | 0 |
| | Without biocide and 0.15% of Polymer 1 | 0 | 0 |

The results show:

that an aqueous solution of biocidal agent alone does not withstand the 15 rinsing operations, that the interaction between the biocide and the polymer introduces long-term protection of the surface against bacteria, without damaging the short-term bactericidal performances, that the polymer in itself does not have a biocidal action.

What is claimed is:

[1. A process for the treatment of hard surfaces, comprising the step of treating said surfaces with an efficient cleaning or rinsing amount of a composition comprising at least one water-soluble or water dispersible copolymer comprising, in the form of polymerized units:

(a) at least one monomer compound of general formula I:

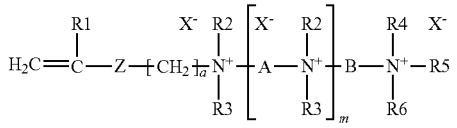

in which $R_1$ is a hydrogen atom, a methyl or ethyl group;

$R_2$, $R_3$, $R_4$, $R_5$ and $R_6$, which are identical or different, are linear or branched $C_1$-$C_6$, alkyl, hydroxyalkyl or aminoalkyl groups;

m is an integer from 0 to 10;

n is an integer from 1 to 6;

Z represents a —C(O)O— or —C(O)NH— group or an oxygen atom;

A represents a $(CH_2)_p$ group, p being an integer from 1 to 6;

B represents a linear or branched $C_2$-$C_{12}$, polymethylene chain optionally interrupted by one or more heteroatoms or heterogroups, and optionally substituted by one or more hydroxyl or amino groups;

X, which are identical or different, represent counterions; and (b) at least one hydrophilic monomer carrying a functional acidic group which is copolymerizable with (a) and which is capable of being ionized in the application medium.]

[2. The process according to claim 1, wherein, in the general formula I:

Z represents C(O)O, C(O)NH or O;

n is equal to 2 or 3;

m ranges from 0 to 2;

B represents

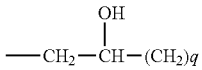

with q from 1 to 4; and $R_1$ to $R_6$, which are identical or different, represent a methyl or ethyl group.]

[3. The process according to claim 1, in which the monomer (a) is represented by the following formula:

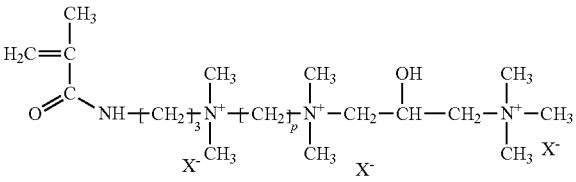

wherein p=2 to 4.]

[4. The process according to claim 1, in which the monomer (a) is:

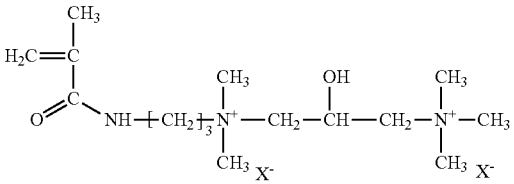

$X^-$ representing a chloride ion.]

[5. The process according to claim 1, wherein said polymer further comprising:

(c) at least one monomer compound with ethylenic unsaturation with a neutral charge which is copolymerizable with (a) and (b).]

[6. The process according to claim 5, wherein (c) is a hydrophilic monomer compound with ethylenic unsaturation with a neutral charge, carrying one or more hydrophilic groups, which is copolymerizable with (a) and (b).]

[7. The process according to claim 1, wherein (b) is a $C_3$-$C_8$ carboxylic, sulfonic, sulfuric, phosphonic or phosphoric acids with monoethylenic unsaturation.]

[8. The process according to claim 5, wherein the monomer (b) is acrylic acid, methacrylic acid, α-ethacrylic acid, β,β-dimethylacrylic acid, methylenemalonic acid, vinylacetic acid, allylacetic acid, ethylidineacetic acid, propylidineacetic acid, crotonic acid, maleic acid, fumaric acid, itaconic acid, citraconic acid, mesaconic acid, N-(methacroyl)alanine, N-(acryloyl)hydroxyglycine, sulfopropyl acrylate, sulfoethyl acrylate, sulfoethyl methacrylate, styrenesulfonic acid, vinylsulfonic acid, vinylphosphonic acid, phosphoethyl acrylate, phophonoethyl acrylate, phosphopropyl acrylate, phophonopropyl acrylate, phosphoethyl methacrylate, phophonoethyl methacrylate, phosphopropyl methacrylate, or phophonopropyl methacrylate.]

[9. The process according to claim 5, wherein the monomer (c) is acrylamide, vinyl alcohol, $C_1$-$C_4$ alkyl ester of acrylic acid and of methacrylic acid, $C_1$-$C_4$ hydroxyalkyl ester of acrylic acid and of methacrylic acid, polyalkoxylated ester of acrylic acid and of methacrylic acid, ester of acrylic acid, ester of methacrylic acid and of polyethylene glycol, polypropylene glycol $C_1$-$C_{25}$ monoalkyl ether, vinyl acetate, vinylpyrrolidone or methyl vinyl ether.]

[10. The process according to claim 1, wherein X is halogen, sulfonate, sulfate, hydrogensulfate, phosphate, phosphanate, citrate, formate or an acetate anion.]

[11. The process according to claim 5, wherein the water-soluble or water-dispersible copolymer is obtained by copolymerization of 3 to 80 mol %, of the monomer (a);

of 10 to 95 mol %, of the monomer (b);

of 0 to 50 mol %, of the monomer (c).]

[12. The process according to claim 1, wherein the monomers (a) and the monomers (b) have a molar ratio by weight of the total of the monomers (a) to the total of the monomers (b) between 80/20 and 5/95.]

[13. The process according to claim 1, wherein the copolymer has a molecular mass of at least 1000.]

[14. The process according to claim 1, wherein the copolymer has the following formula:

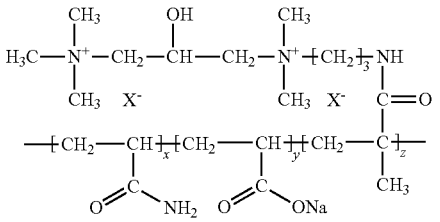

wherein x having a mean value of 0 to 50%, y having a mean value of 10 to 95%, z having a mean value of 3 to 80%, and with x+y+z=100%, x, y and z representing the mol % of units derived from acrylamide, acrylic acid (sodium salt) and from Diquat respectively;

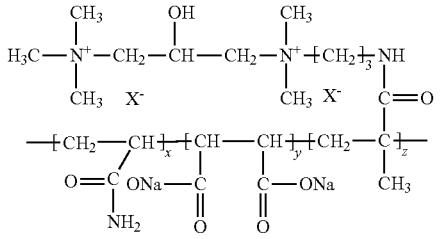

wherein x having a mean value of 0 to 50%,
y having a mean value of 10 to 95%, and
z having a mean value of 3 to 80%,

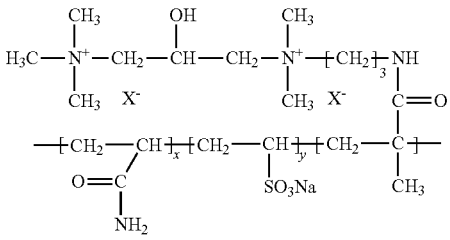

wherein x having a mean value of 0 to 50%,
y having a mean value of 10 to 95%, and
z having a mean value of 3 to 80%,

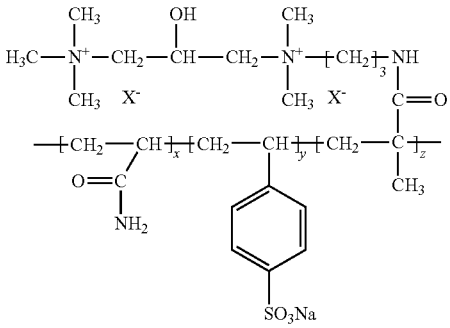

wherein x having a mean value of 0 to 50%,
y having a mean value of 10 to 95%, and
z having a mean value of 3 to 80%,

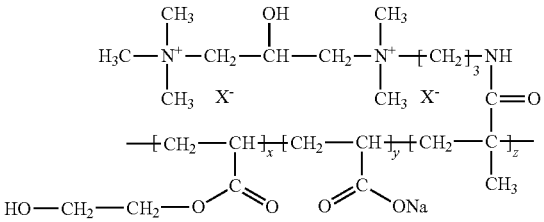

wherein x having a mean value of 0 to 50%,
y having a mean value of 10 to 95%, and
z having a mean value of 3 to 80%,

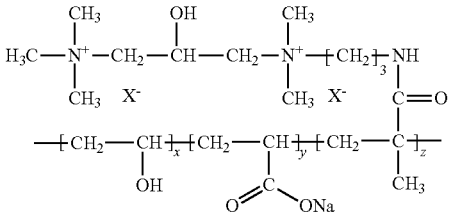

wherein x having a mean value of 0 to 50%,
y having a mean value of 10 to 95%, and
z having a mean value of 3 to 80%, or

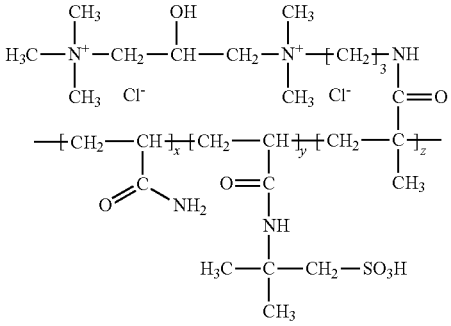

wherein x having a mean value of 0 to 50%,
y having a mean value of 10 to 95%, and
z having a mean value of 3 to 80%.]

[15. The process according to claim 1, wherein the copolymer of formula I represents from 0.0005 to 10% by weight with respect to the total weight of said composition.]

[16. The process according to claim 1, wherein said composition further comprises a surfactant, with a copolymer/surfactant ratio by weight of between 1/2 and 1/100.]

[17. A process for cleaning windows, comprising the step of treating said windows with a an efficient cleaning amount of a composition comprising:

from 0.001 to 10%, by weight of a water-soluble or water-dispersible copolymer comprising, in the form of polymerized units:

(a) at least one monomer compound of general formula I:

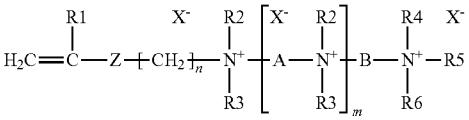

in which $R_1$ is a hydrogen atom, a methyl or ethyl group;

$R_2$, $R_3$, $R_4$, $R_5$ and $R_6$, which are identical or different, are linear or branched $C_1$-$C_6$, alkyl, hydroxyalkyl or aminoalkyl groups;

m is an integer from 0 to 10;

n is an integer from 1 to 6;

Z represents a —C(O)O— or —C(O)NH— group or an oxygen atom;

A represents a $(CH_2)_p$ group, p being an integer from 1 to 6;

B represents a linear or branched $C_2$-$C_{12}$, polymethylene chain optionally interrupted by one or more heteroatoms or heterogroups, and optionally substituted by one or more hydroxyl or amino groups;

X, which are identical or different, represent counterions; and (b) at least one hydrophilic monomer carrying a functional acidic group which is copolymerizable with (a) and which is capable of being ionized in the application medium;

from 0.005 to 20%, by weight of at least one nonionic and/or anionic surfactant;

the remainder being formed of water, or solvents.]

[18. The process according to claim 17, wherein said composition further comprises an amine oxide as nonionic surfactant.]

[19. A process for washing dishes in an automatic dishwasher, comprising the step of treating said dishes with an efficient washing amount of a composition comprising:

from 0.001 to 10%, by weight of a water-soluble or water-dispersible copolymer comprising, in the form of polymerized units:

(a) at least one monomer compound of general formula I:

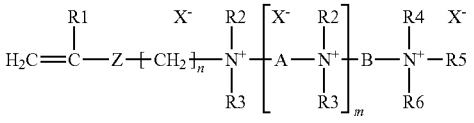

in which $R_1$ is a hydrogen atom, a methyl or ethyl group;

$R_2$, $R_3$, $R_4$, $R_5$ and $R_6$, which are identical or different, are linear or branched $C_1$-$C_6$, alkyl, hydroxyalkyl or aminoalkyl groups;

m is an integer from 0 to 10;

n is an integer from 1 to 6;

Z represents a —C(O)O— or —C(O)NH— group or an oxygen atom;

A represents a $(CH_2)_p$ group, p being an integer from 1 to 6;

B represents a linear or branched $C_2$-$C_{12}$, polymethylene chain optionally interrupted by one or more heteroatoms or heterogroups, and optionally substituted by one or more hydroxyl or amino groups;

X, which are identical or different, represent counterions; and (b) at least one hydrophilic monomer carrying a functional acidic group which is copolymerizable with (a) and which is capable of being ionized in the application medium;

from 0.2 to 10%, by weight with respect to the total weight of dry matter of a surfactant, and, optionally;

from 30 to 95% by weight with respect to the total weight of detergent composition, expressed as dry matter, of builders; and from 3 to 25% by weight with respect to the total weight of the composition of an oxidizing system.]

[20. A process for rinsing dishes in an automatic dishwasher, comprising the step of treating said dishes with an efficient rinsing amount of a composition comprising:

from 0.02 to 10%, by weight of water-soluble or water-dispersible copolymer, with respect to the total weight of the composition, said copolymer comprising from 0.001 to 10%, by weight of a water-soluble or water-dispersible copolymer comprising, in the form of polymerized units:

(a) at least one monomer compound of general formula I:

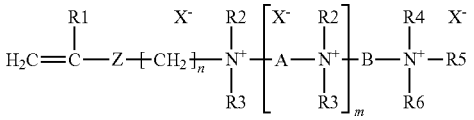

in which $R_1$ is a hydrogen atom, a methyl or ethyl group;

$R_2$, $R_3$, $R_4$, $R_5$ and $R_6$, which are identical or different, are linear or branched $C_1$-$C_6$, alkyl, hydroxyalkyl or aminoalkyl groups;

m is an integer from 0 to 10;

n is an integer from 1 to 6;

Z represents a —C(O)O— or —C(O)NH— group or an oxygen atom;

A represents a $(CH_2)_p$ group, p being an integer from 1 to 6;

B represents a linear or branched $C_2$-$C_{12}$, polymethylene chain optionally interrupted by one or more heteroatoms or heterogroups, and optionally substituted by one or more hydroxyl or amino groups;

X, which are identical or different, represent counterions; and (b) at least one hydrophilic monomer carrying a functional acidic group which is copolymerizable with (a) and which is capable of being ionized in the application medium;

from 0.2 to 15%, by weight with respect to the total weight of said composition of a nonionic surfactant or a mixture of nonionic and anionic surfactants;

from 0 to 40%, by weight with respect to the total weight of dry matter of a calcium-sequestering organic acid; and from 0 to 15%, by weight with respect to the total weight of said composition, expressed as dry matter, of an auxiliary agent of copolymer of acrylic acid and of maleic anhydride or acrylic acid homopolymers.]

[21. A process for washing dishes by hand comprising the step of treating said dishes with an efficient cleaning amount of a composition comprising:

from 0.1 to 5 parts by weight with respect to the total weight of said composition of water-soluble or water-dispersible copolymer comprising, in the form of polymerized units:

(a) at least one monomer compound of general formula I:

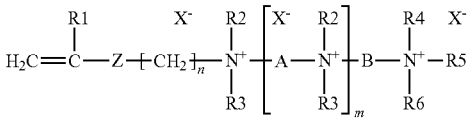

in which $R_1$ is a hydrogen atom, a methyl or ethyl group;

$R_2$, $R_3$, $R_4$, $R_5$ and $R_6$, which are identical or different, are linear or branched $C_1$-$C_6$, alkyl, hydroxyalkyl or aminoalkyl groups;

m is an integer from 0 to 10;

n is an integer from 1 to 6;

Z represents a —C(O)— or —C(O)NH— group or an oxygen atom;

A represents a $(CH_2)_p$ group, p being an integer from 1 to 6;

B represents a linear or branched $C_2$-$C_{12}$, polymethylene chain optionally interrupted by one or more heteroatoms or heterogroups, and optionally substituted by one or more hydroxyl or amino groups;

X, which are identical or different, represent counterions; and (b) at least one hydrophilic monomer carrying a functional acidic group which is copolymerizable with (a) and which is capable of being ionized in the application medium;

from 5 to 50, parts by weight of at least one surfactant;

at least one noncationic bactericide or disinfectant;

at least one synthetic cationic polymer agent;

a polymer for controling the viscosity of the mixture or the stability of the foams;

a hydrotropic agent;

a hydrating or moisturizing agent or an agent for protecting the skin; and a dye or fragrance, and a preservative.]

[22. A process for the external cleaning of motor vehicles, comprising the step of cleaning said motor vehicles with an efficient cleaning amount of a composition comprising, in the form of polymerized units:

(a) at least one monomer compound of general formula I:

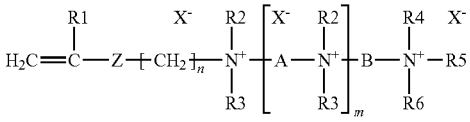

in which $R_1$ is a hydrogen atom, a methyl or ethyl group;

$R_2$, $R_3$, $R_4$, $R_5$ and $R_6$, which are identical or different, are linear or branched $C_1$-$C_6$, alkyl, hydroxyalkyl or aminoalkyl groups;

m is an integer from 0 to 10;

n is an integer from 1 to 6;

Z represents a —C(O)O— or —C(O)NH— group or an oxygen atom;

A represents a $(CH_2)_p$ group, p being an integer from 1 to 6;

B represents a linear or branched $C_2$-$C_{12}$, polymethylene chain optionally interrupted by one or more heteroatoms or heterogroups, and optionally substituted by one or more hydroxyl or amino groups;

X, which are identical or different, represent counterions; and (b) at least one hydrophilic monomer carrying a functional acidic group which is copolymerizable with (a) and which is capable of being ionized in the application medium;

from 0 to 30%, by weight of the formulation of at least one nonionic surfactant;

from 0 to 30%, by weight of the formulation of at least one anionic surfactant;

from 0 to 30%, by weight of an amphoteric and/or zwitterionic surfactant;

from 0 to 30%, by weight of a cationic surfactant; the minimum amount of surfactant being at least 1%;

an inorganic or organic builder; and optionally, a hydrotropic agent, filler or pH modifier.]

[23. A process for cleaning ceramics, tilings, baths and sinks, comprising the step of cleaning said ceramics, tilings, baths and sinks with an efficient cleaning amount of a composition comprising:

from 0.02 to 5% by weight with respect to the total weight of said composition of water-soluble or water-dispersible copolymer comprising, in the form of polymerized units:

(a) at least one monomer compound of general formula I:

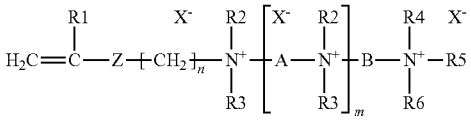

in which $R_1$ is a hydrogen atom, a methyl or ethyl group;

$R_2$, $R_3$, $R_4$, $R_5$ and $R_6$, which are identical or different, are linear or branched $C_1$-$C_6$, alkyl, hydroxyalkyl or aminoalkyl groups;

m is an integer from 0 to 10;

n is an integer from 1 to 6;

Z represents a —C(O)O— or —C(O)NH— group or an oxygen atom;

A represents a $(CH_2)_p$ group, p being an integer from 1 to 6;

B represents a linear or branched $C_2$-$C_{12}$, polymethylene chain optionally interrupted by one or more heteroatoms or heterogroups, and optionally substituted by one or more hydroxyl or amino groups;

X, which are identical or different, represent counterions; and (b) at least one hydrophilic monomer carrying a functional acidic group which is copolymerizable with (a) and which is capable of being ionized in the application medium;

from 0 to 30%, by weight of at least one nonionic surfactant;

from 0 to 30%, by weight of at least one anionic surfactant, the total amount of surfactants representing from 1.5 to 50%, by weight, with respect to the total weight of the composition;

from 0.1 to 25% by weight with respect to the total weight of the composition of at least one organic or inorganic builder; and optionally a foam modifier, said composition exhibiting a pH of between 3 and 1 and an a/b molar ratio of between 30/70 and 60/40.]

[24. A process for cleaning toilet bowls, comprising the step of cleaning said toilet bowls with a cleaning efficient amount of a composition comprising, in the form of polymerized units:

(a) at least one monomer compound of general formula I:

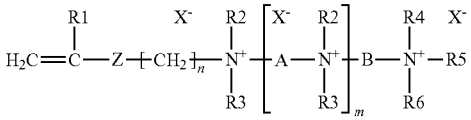

in which $R_1$ is a hydrogen atom, a methyl or ethyl group;

$R_2$, $R_3$, $R_4$, $R_5$ and $R_6$, which are identical or different, are linear or branched $C_1$-$C_6$, alkyl, hydroxyalkyl or aminoalkyl groups;

m is an integer from 0 to 10;

n is an integer from 1 to 6;

Z represents a —C(O))O— or —C(O)NH— group or an oxygen atom;

A represents a $(CH_2)_p$ group, p being an integer from 1 to 6;

B represents a linear or branched $C_2$-$C_{12}$, polymethylene chain optionally interrupted by one or more heteroatoms or heterogroups, and optionally substituted by one or more hydroxyl or amino groups;

X, which are identical or different, represent counterions; and (b) at least one hydrophilic monomer carrying a functional acidic group which is copolymerizable with (a) and which is capable of being ionized in the application medium;

from 0.1 to 40% by weight with respect to the total weight of the composition of an inorganic acid cleaning agent selected from the group consisting of phosphoric acid, sulfamic acid, hydrochloric acid, hydrofluoric acid, sulfuric acid, nitric acid, acetic acid, hydroxyacetic acid, adipic acid, citric acid, formic acid, fumaric acid, gluconic acid, glutaric acid, glycolic acid, malic acid, maleic acid, lactic acid, malonic acid, oxalic acid, succinic acid and sodium bisulfate;

from 0.5 to 10% by weight of a surfactant;

from 0.1 to 3% by weight of a thickener; and a preservative intended to prevent the growth of microorganisms; said composition exhibiting a pH of between 0.5 and 4.]

[25. A process for rinsing shower walls, comprising the step of rinsing said shower walls with a rinsing efficient amount of a composition comprising:

from 0.02 to 5% by weight, of water-soluble or water-dispersible copolymer comprising, in the form of polymerized units:

(a) at least one monomer compound of general formula I:

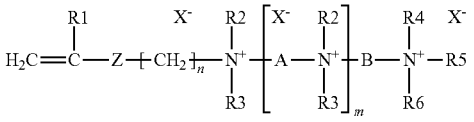

in which $R_1$ is a hydrogen atom, a methyl or ethyl group;

$R_2$, $R_3$, $R_4$, $R_5$ and $R_6$, which are identical or different, are linear or branched $C_3$-$C_6$, alkyl, hydroxyalkyl or aminoalkyl groups;

m is an integer from 0 to 10;

n is an integer from 1 to 6;

Z represents a —C(O)O— or —C(O)NH— group or an oxygen atom;

A represents a $(CH_2)_p$ group, p being an integer from 1 to 6;

B represents a linear or branched $C_2$-$C_{12}$, polymethylene chain optionally interrupted by one or more heteroatoms or heterogroups, and optionally substituted by one or more hydroxyl or amino groups;

X, which are identical or different, represent counterions; and (b) at least one hydrophilic monomer carrying a functional acidic group which is copolymerizable with (a) and which is capable of being ionized in the application medium;

from 0.5 to 5% by weight of a nonionic surfactant; and optionally from 0.01 to 5% by weight of a metal-chelating agent.]

[26. A process for cleaning a hard surface according to claim 1, thereby conferring hydrophilization properties on said hard surface.]

[27. The process according to claim 26, wherein the hydrophilization properties are "resistance to running", "resistance to condensation", "resistance to stains" or "resistance to marks".]

[28. The process according to claim 1, wherein from 0.0001 to 6 g/m$^2$, of said water-soluble or water-dispersible copolymer are deposited on said surface.]

[29. The process according to claim 28, wherein the surface is a glass, a ceramic, a tile, a sink, a toilet bowl, a window, a shower wall, or a motor vehicle.]

*30. A process for the treatment of hard surfaces, comprising the step of treating said surfaces with an efficient cleaning or rinsing amount of a composition comprising at least one water-soluble or water dispersible copolymer comprising, in the form of polymerized units:*

*(a) at least one monomer compound of general formula I:*

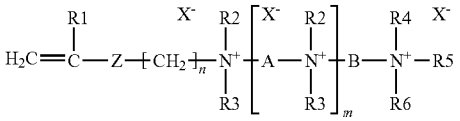

*in which*

*$R_1$ is a hydrogen atom, a methyl or ethyl group;*

*$R_2$, $R_3$, $R_4$, $R_5$ and $R_6$, which are identical or different, are linear or branched $C_1$-$C_6$, alkyl, hydroxyalkyl or aminoalkyl groups;*

*m is an integer from 0 to 10;*

*n is an integer from 1 to 6;*

*Z represents a —C(O)O— or —C(O)NH— group or an oxygen atom;*

*A represents a $(CH_2)_p$ group, p being an integer from 1 to 6;*

*B represents a linear or branched $C_2$-$C_{12}$, polymethylene chain optionally interrupted by one or more heteroatoms or heterogroups, and optionally substituted by one or more hydroxyl or amino groups;*

*X, which are identical or different, represent counterions; and*

*(b) at least one hydrophilic monomer carrying a functional acidic group which is copolymerizable with (a) and which is capable of being ionized in the application medium.*

*31. The process according to claim 30, wherein, in the general formula I:*

*Z represents C(O)O, C(O)NH or O;*

*n is equal to 2 or 3;*

*m ranges from 0 to 2;*

*B represents*

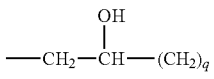

*with q from 1 to 4; and*

*$R_1$ to $R_6$, which are identical or different, represent a methyl or ethyl group.*

32. The process according to claim 30, in which the monomer (a) is represented by the following formula:

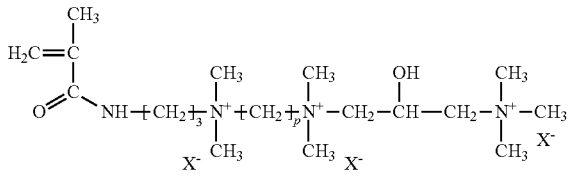

wherein p=2 to 4.

33. The process according to claim 30, in which the monomer (a) is:

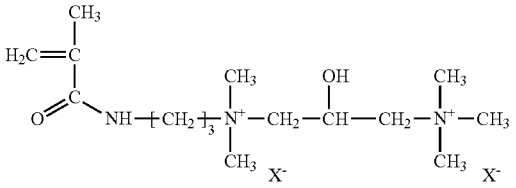

$X^-$ representing a chloride ion.

34. The process according to claim 30, wherein said polymer further comprising:

(c) at least one monomer compound with ethylenic unsaturation with a neutral charge which is copolymerizable with (a) and (b).

35. The process according to claim 34, wherein (c) is a hydrophilic monomer compound with ethylenic unsaturation with a neutral charge, carrying one or more hydrophilic groups, which is copolymerizable with (a) and (b).

36. The process according to claim 30, wherein (b) is a $C_3$-$C_8$ carboxylic, sulfonic, sulfuric, phosphonic or phosphoric acids with monoethylenic unsaturation.

37. The process according to claim 34, wherein the monomer (b) is acrylic acid, methacrylic acid, α-ethacrylic acid, β,β-dimethylacrylic acid, methylenemalonic acid, vinylacetic acid, allylacetic acid, ethylidineacetic acid, propylidineacetic acid, crotonic acid, maleic acid, fumaric acid, itaconic acid, citraconic acid, mesaconic acid, N-(methacroyl)alanine, N-(acryloyl)hydroxyglycine, sulfopropyl acrylate, sulfoethyl acrylate, sulfoethyl methacrylate, styrenesulfonic acid, vinylsulfonic acid, vinylphosphonic acid, phosphoethyl acrylate, phophonoethyl acrylate, phosphopropyl acrylate, phophonopropyl acrylate, phosphoethyl methacrylate, phophonoethyl methacrylate, phosphopropyl methacrylate, or phophonopropyl methacrylate.

38. The process according to claim 34, wherein the monomer (c) is acrylamide, vinyl alcohol, $C_1$-$C_4$ alkyl ester of acrylic acid and of methacrylic acid, $C_1$-$C_4$ hydroxyalkyl ester of acrylic acid and of methacrylic acid, polyalkoxylated ester of acrylic acid and of methacrylic acid, ester of acrylic acid, ester of methacrylic acid and of polyethylene glycol, polypropylene glycol $C_1$-$C_{25}$ monoalkyl ether, vinyl acetate, vinylpyrrolidone or methyl vinyl ether.

39. The process according to claim 30, wherein X is halogen, sulfonate, sulfate, hydrogensulfate, phosphate, phosphanate, citrate, formate or an acetate anion.

40. The process according to claim 34, wherein the water-soluble or water-dispersible copolymer is obtained by copolymerization of 3 to 80 mol %, of the monomer (a);

of 10 to 95 mol %, of the monomer (b);

of 0 to 50 mol %, of the monomer (c).

41. The process according to claim 30, wherein the monomers (a) and the monomers (b) have a molar ratio by weight of the total of the monomers (a) to the total of the monomers (b) between 80/20 and 5/95.

42. The process according to claim 30, wherein the copolymer has a molecular mass of at least 1000.

43. The process according to claim 30, wherein the copolymer has the following formula:

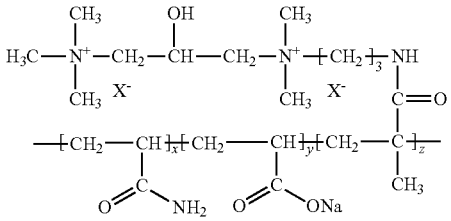

wherein x having a mean value of 0 to 50%, y having a mean value of 10 to 95%, z having a mean value of 3 to 80%, and with x+y+z=100%, x, y and z representing the mol % of units derived from acrylamide, acrylic acid (sodium salt) and from Diquat respectively;

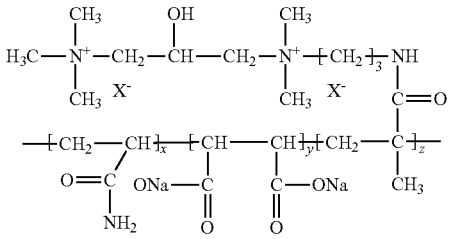

wherein x having a mean value of 0 to 50%, y having a mean value of 10 to 95%, and z having a mean value of 3 to 80%,

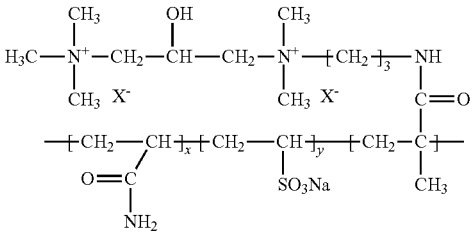

wherein x having a mean value of 0 to 50%, y having a mean value of 10 to 95%, and z having a mean value of 3 to 80%,

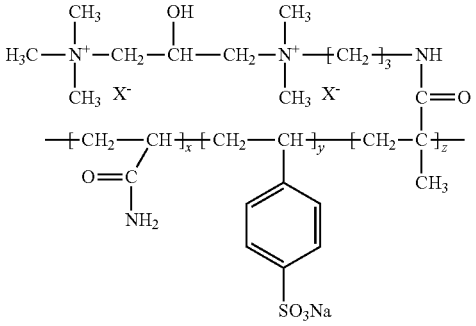

*wherein*

*x having a mean value of 0 to 50%,*

*y having a mean value of 10 to 95%, and*

*z having a mean value of 3 to 80%,*

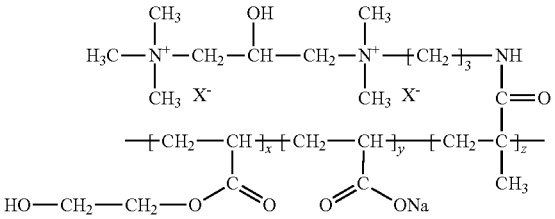

*wherein*

*x having a mean value of 0 to 50%,*

*y having a mean value of 10 to 95%, and*

*z having a mean value of 3 to 80%,*

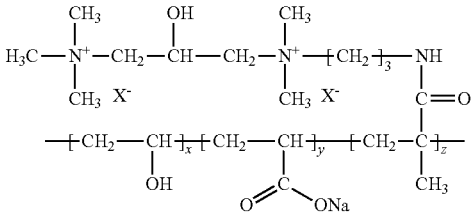

*wherein*

*x having a mean value of 0 to 50%,*

*y having a mean value of 10 to 95%, and*

*z having a mean value of 3 to 80%, or*

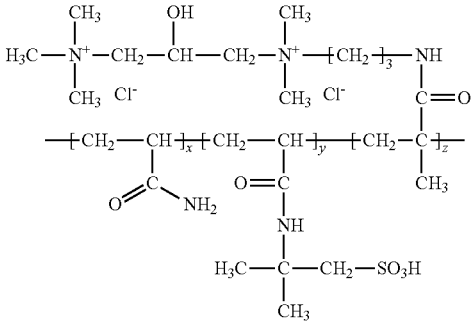

*wherein*

*x having a mean value of 0 to 50%,*

*y having a mean value of 10 to 95%, and*

*z having a mean value of 3 to 80%.*

*44. The process according to claim 30, wherein the copolymer of formula I represents from 0.0005 to 10% by weight with respect to the total weight of said composition.*

*45. The process according to claim 30, wherein said composition further comprises a surfactant, with a copolymer/surfactant ratio by weight of between 1/2 and 1/100.*

*46. A process for cleaning windows, comprising the step of treating said windows with a an efficient cleaning amount of a composition comprising: from 0.001 to 10%, by weight of a water-soluble or water-dispersible copolymer comprising, in the form of polymerized units:*

*(a) at least one monomer compound of general formula I:*

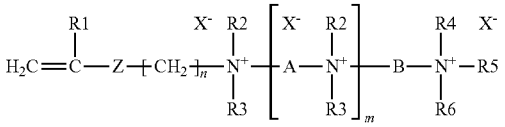

*in which*

*$R_1$ is a hydrogen atom, a methyl or ethyl group;*

*$R_2$, $R_3$, $R_4$, $R_5$ and $R_6$, which are identical or different, are linear or branched $C_1$-$C_6$, alkyl, hydroxyalkyl or aminoalkyl groups;*

*m is an integer from 0 to 10;*

*n is an integer from 1 to 6;*

*Z represents a —C(O)O— or —C(O)NH— group or an oxygen atom;*

*A represents a $(CH_2)_p$ group, p being an integer from 1 to 6;*

*B represents a linear or branched $C_2$-$C_{12}$, polymethylene chain optionally interrupted by one or more heteroatoms or heterogroups, and optionally substituted by one or more hydroxyl or amino groups;*

*X, which are identical or different, represent counterions; and*

*(b) at least one hydrophilic monomer carrying a functional acidic group which is copolymerizable with (a) and which is capable of being ionized in the application medium;*

*from 0.005 to 20%, by weight of at least one nonionic and/or anionic surfactant;*

*the remainder being formed of water, or solvents.*

*47. The process according to claim 46, wherein said composition further comprises an amine oxide as nonionic surfactant.*

*48. A process for washing dishes in an automatic dishwasher, comprising the step of treating said dishes with an efficient washing amount of a composition comprising: from 0.001 to 10%, by weight of a water-soluble or water-dispersible copolymer comprising, in the form of polymerized units:*

*(a) at least one monomer compound of general formula I:*

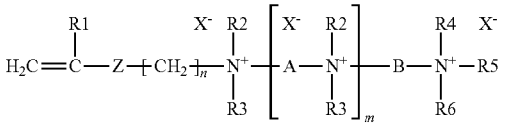

in which $R_1$ is a hydrogen atom, a methyl or ethyl group;

$R_2$, $R_3$, $R_4$, $R_5$ and $R_6$, which are identical or different, are linear or branched $C_1$-$C_6$, alkyl, hydroxyalkyl or aminoalkyl groups;

m is an integer from 0 to 10;

n is an integer from 1 to 6;

Z represents a —C(O)O— or —C(O)NH— group or an oxygen atom;

A represents a $(CH_2)_p$ group, p being an integer from 1 to 6;

B represents a linear or branched $C_2$-$C_{12}$, polymethylene chain optionally interrupted by one or more heteroatoms or heterogroups, and optionally substituted by one or more hydroxyl or amino groups;

X, which are identical or different, represent counterions; and (b) at least one hydrophilic monomer carrying a functional acidic group which is copolymerizable with (a) and which is capable of being ionized in the application medium;

from 0.2 to 10%, by weight with respect to the total weight of dry matter of a surfactant, and, optionally;

from 30 to 95% by weight with respect to the total weight of detergent composition, expressed as dry matter, of builders; and from 3 to 25% by weight with respect to the total weight of the composition of an oxidizing system.

49. A process for rinsing dishes in an automatic dishwasher, comprising the step of treating said dishes with an efficient rinsing amount of a composition comprising:

from 0.02 to 10%, by weight of water-soluble or water-dispersible copolymer, with respect to the total weight of the composition, said copolymer comprising from 0.001 to 10%, by weight of a water-soluble or water-dispersible copolymer comprising, in the form of polymerized units:

(a) at least one monomer compound of general formula I:

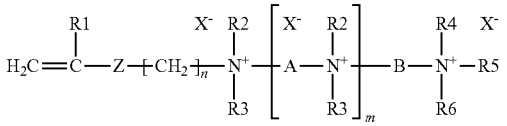

in which $R_1$ is a hydrogen atom, a methyl or ethyl group;

$R_2$, $R_3$, $R_4$, $R_5$ and $R_6$, which are identical or different, are linear or branched $C_1$-$C_6$, alkyl, hydroxyalkyl or aminoalkyl groups;

m is an integer from 0 to 10;

n is an integer from 1 to 6;

Z represents a —C(O)O— or —C(O)NH— group or an oxygen atom;

A represents a $(CH_2)_p$ group, p being an integer from 1 to 6;

B represents a linear or branched $C_2$-$C_{12}$, polymethylene chain optionally interrupted by one or more heteroatoms or heterogroups, and optionally substituted by one or more hydroxyl or amino groups;

X, which are identical or different, represent counterions; and (b) at least one hydrophilic monomer carrying a functional acidic group which is copolymerizable with (a) and which is capable of being ionized in the application medium;

from 0.2 to 15%, by weight with respect to the total weight of said composition of a nonionic surfactant or a mixture of nonionic and anionic surfactants;

from 0 to 40%, by weight with respect to the total weight of dry matter of a calcium-sequestering organic acid; and from 0 to 15%, by weight with respect to the total weight of said composition, expressed as dry matter, of an auxiliary agent of copolymer of acrylic acid and of maleic anhydride or acrylic acid homopolymers.

50. A process for washing dishes by hand comprising the step of treating said dishes with an efficient cleaning amount of a composition comprising:

from 0.1 to 5 parts by weight with respect to the total weight of said composition of water-soluble or water-dispersible copolymer comprising, in the form of polymerized units:

(a) at least one monomer compound of general formula I:

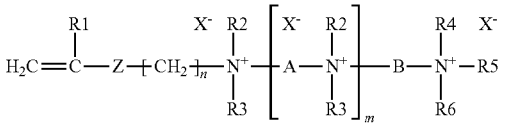

in which $R_1$ is a hydrogen atom, a methyl or ethyl group;

$R_2$, $R_3$, $R_4$, $R_5$ and $R_6$, which are identical or different, are linear or branched $C_1$-$C_6$, alkyl, hydroxyalkyl or aminoalkyl groups;

m is an integer from 0 to 10;

n is an integer from 1 to 6;

Z represents a —C(O)O— or —C(O)NH— group or an oxygen atom;

A represents a $(CH_2)_p$ group, p being an integer from 1 to 6;

B represents a linear or branched $C_2$-$C_{12}$, polymethylene chain optionally interrupted by one or more heteroatoms or heterogroups, and optionally substituted by one or more hydroxyl or amino groups;

X, which are identical or different, represent counterions; and (b) at least one hydrophilic monomer carrying a functional acidic group which is copolymerizable with (a) and which is capable of being ionized in the application medium;

from 5 to 50, parts by weight of at least one surfactant;

at least one noncationic bactericide or disinfectant;

at least one synthetic cationic polymer agent;

a polymer for controling the viscosity of the mixture or the stability of the foams;

a hydrotropic agent;

a hydrating or moisturizing agent or an agent for protecting the skin; and a dye or fragrance, and a preservative.

51. A process for the external cleaning of motor vehicles, comprising the step of cleaning said motor vehicles with an efficient cleaning amount of a composition comprising, in the form of polymerized units:

(a) at least one monomer compound of general formula I:

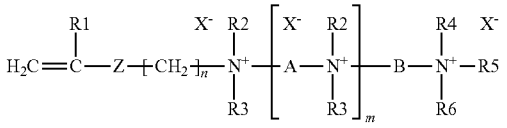

in which $R_1$ is a hydrogen atom, a methyl or ethyl group;

$R_2$, $R_3$, $R_4$, $R_5$ and $R_6$, which are identical or different, are linear or branched $C_1$-$C_6$, alkyl, hydroxyalkyl or aminoalkyl groups;

m is an integer from 0 to 10;

n is an integer from 1 to 6;

Z represents a —C(O)O— or —C(O)NH— group or an oxygen atom;

A represents a $(CH_2)_p$ group, p being an integer from 1 to 6;

B represents a linear or branched $C_2$-$C_{12}$, polymethylene chain optionally interrupted by one or more heteroatoms or heterogroups, and optionally substituted by one or more hydroxyl or amino groups;

X, which are identical or different, represent counterions; and (b) at least one hydrophilic monomer carrying a functional acidic group which is copolymerizable with (a) and which is capable of being ionized in the application medium;

from 0 to 30%, by weight of the formulation of at least one nonionic surfactant;

from 0 to 30%, by weight of the formulation of at least one anionic surfactant;

from 0 to 30%, by weight of an amphoteric and/or zwitterionic surfactant;

from 0 to 30%, by weight of a cationic surfactant; the minimum amount of surfactant being at least 1%;

an inorganic or organic builder; and optionally, a hydrotropic agent, filler or pH modifier.

52. A process for cleaning ceramics, tilings, baths and sinks, comprising the step of cleaning said ceramics, tilings, baths and sinks with an efficient cleaning amount of a composition comprising:

from 0.02 to 5% by weight with respect to the total weight of said composition of water-soluble or water-dispersible copolymer comprising, in the form of polymerized units:

(a) at least one monomer compound of general formula I:

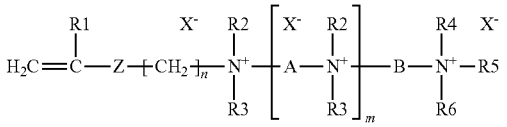

in which $R_1$ is a hydrogen atom, a methyl or ethyl group;

$R_2$, $R_3$, $R_4$, $R_5$ and $R_6$, which are identical or different, are linear or branched $C_1$-$C_6$, alkyl, hydroxyalkyl or aminoalkyl groups;

m is an integer from 0 to 10;

n is an integer from 1 to 6;

Z represents a —C(O)O— or —C(O)NH— group or an oxygen atom;

A represents a $(CH_2)_p$ group, p being an integer from 1 to 6;

B represents a linear or branched $C_2$-$C_{12}$, polymethylene chain optionally interrupted by one or more heteroatoms or heterogroups, and optionally substituted by one or more hydroxyl or amino groups;

X, which are identical or different, represent counterions; and (b) at least one hydrophilic monomer carrying a functional acidic group which is copolymerizable with (a) and which is capable of being ionized in the application medium;

from 0 to 30%, by weight of at least one nonionic surfactant;

from 0 to 30%, by weight of at least one anionic surfactant, the total amount of surfactants representing from 1.5 to 50%, by weight, with respect to the total weight of the composition;

from 0.1 to 25% by weight with respect to the total weight of the composition of at least one organic or inorganic builder; and optionally a foam modifier, said composition exhibiting a pH of between 3 and 1 and an a/b molar ratio of between 30/70 and 60/40.

53. A process for cleaning toilet bowls, comprising the step of cleaning said toilet bowls with a cleaning efficient amount of a composition comprising, in the form of polymerized units:

(a) at least one monomer compound of general formula I:

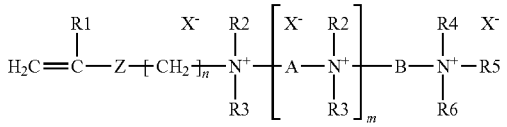

in which $R_1$ is a hydrogen atom, a methyl or ethyl group;

$R_2$, $R_3$, $R_4$, $R_5$ and $R_6$, which are identical or different, are linear or branched $C_1$-$C_6$, alkyl, hydroxyalkyl or aminoalkyl groups;

m is an integer from 0 to 10;

n is an integer from 1 to 6;

Z represents a —C(O)O— or —C(O)NH— group or an oxygen atom;

A represents a $(CH_2)_p$ group, p being an integer from 1 to 6;

B represents a linear or branched $C_2$-$C_{12}$, polymethylene chain optionally interrupted by one or more heteroatoms or heterogroups, and optionally substituted by one or more hydroxyl or amino groups;

X, which are identical or different, represent counterions; and (b) at least one hydrophilic monomer carrying a functional acidic group which is copolymerizable with (a) and which is capable of being ionized in the application medium;

from 0.1 to 40% by weight with respect to the total weight of the composition of an inorganic acid cleaning agent selected from the group consisting of phosphoric acid, sulfamic acid, hydrochloric acid, hydrofluoric acid, sulfuric acid, nitric acid, acetic acid, hydroxyacetic acid, adipic acid, citric acid, formic acid, fumaric acid, glu-

*conic acid, glutaric acid, glycolic acid, malic acid, maleic acid, lactic acid, malonic acid, oxalic acid, succinic acid and sodium bisulfate;*

*from 0.5 to 10% by weight of a surfactant;*

*from 0.1 to 3% by weight of a thickener; and*

*a preservative intended to prevent the growth of microorganisms; said composition exhibiting a pH of between 0.5 and 4.*

*54. A process for rinsing shower walls, comprising the step of rinsing said shower walls with a rinsing efficient amount of a composition comprising:*

*from 0.02 to 5% by weight, of water-soluble or water-dispersible copolymer comprising, in the form of polymerized units:*

*(a) at least one monomer compound of general formula I:*

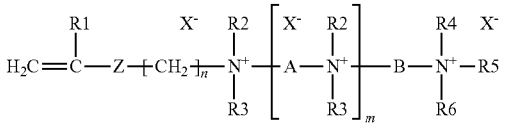

*in which*

*$R_1$ is a hydrogen atom, a methyl or ethyl group;*

*$R_2$, $R_3$, $R_4$, $R_5$ and $R_6$, which are identical or different, are linear or branched $C_1$-$C_6$, alkyl, hydroxyalkyl or aminoalkyl groups;*

*m is an integer from 0 to 10;*

*n is an integer from 1 to 6;*

*Z represents a —C(O)O— or —C(O)NH— group or an oxygen atom;*

*A represents a $(CH_2)_p$ group, p being an integer from 1 to 6;*

*B represents a linear or branched $C_2$-$C_{12}$, polymethylene chain optionally interrupted by one or more heteroatoms or heterogroups, and optionally substituted by one or more hydroxyl or amino groups;*

*X, which are identical or different, represent counterions; and*

*(b) at least one hydrophilic monomer carrying a functional acidic group which is copolymerizable with (a) and which is capable of being ionized in the application medium;*

*from 0.5 to 5% by weight of a nonionic surfactant; and optionally from 0.01 to 5% by weight of a metal-chelating agent.*

*55. A process for cleaning a hard surface according to claim 30, thereby conferring hydrophilization properties on said hard surface.*

*56. The process according to claim 55, wherein the hydrophilization properties are "resistance to running", "resistance to condensation", "resistance to stains" or "resistance to marks".*

*57. The process according to claim 30, wherein from 0.0001 to 6 g/m$^2$, of said water-soluble or water-dispersible copolymer are deposited on said surface.*

*58. The process according to claim 57, wherein the surface is a glass, a ceramic, a tile, a sink, a toilet bowl, a window, a shower wall, or a motor vehicle.*

*59. A cleaning/rinsing composition, comprising at least one surfactant and/or at least one cleaning additive or vehicle and at least one water-soluble or water dispersible copolymer which comprises the copolymerizate of:*

*(a) at least one monomer compound of general formula I:*

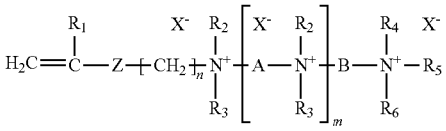

*in which:*

*$R_1$ is a hydrogen atom, a methyl or ethyl group;*

*$R_2$, $R_3$, $R_4$, $R_5$ and $R_6$, which are identical or different, are linear or branched $C_1$-$C_6$, alkyl, hydroxyalkyl or aminoalkl groups;*

*m is an integer ranging from 0 to 10;*

*n is an integer ranging from 1 to 6;*

*Z is a —C(O)O— or —C(O)NH— group or an oxygen atom;*

*A is a $(CH_2)_p$ group, p being an integer ranging from 1 to 6;*

*B is a linear or branched $C_2$-$C_{12}$, polymethylene chain optionally interrupted by one or more heteroatoms or heterogroups, and optionally substituted by one or more hydroxyl or amino groups;*

*X, which are identical or different, represent counterions; and*

*(b) at least one hydrophilic monomer carrying a functional acidic group which is copolymerizable with (a) and which is capable of being ionized in a cleaning/rinsing medium; the at least one monomer (a) being effective to enable anchoring of said copolymer to a surface to be cleaned and the at least one monomer (b) being effective to confer hydrophilic characteristics thereon.*

*60. The cleaning/rinsing composition as defined by claim 59, wherein, in the general formula I:*

*Z is C(O)O, C(O)NH or O;*

*n is equal to 2 or 3;*

*m ranges from 0 to 2;*

*B is*

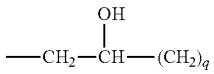

*with q from 1 to 4; and*

*$R_1$ to $R_6$, which are identical or different, represent a methyl or ethyl group.*

*61. The cleaning/rinsing composition as defined by claim 59, in which the monomer (a) is:*

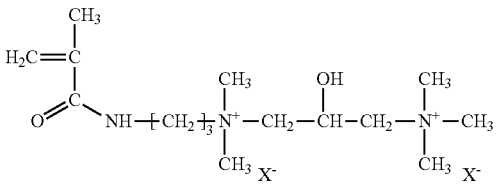

*$X^-$ representing a chloride ion.*

62. The cleaning/rinsing composition as defined by claim 59, said at least one water-soluble or water-dispersible copolymer further comprising:

(c) at least one monomer compound with ethylenic unsaturation with a neutral charge which is copolymerizable with (a) and (b).

63. The cleaning/rinsing composition as defined by claim 59, wherein (c) is a hydrophilic monomer compound with ethylenic unsaturation with a neutral charge, carrying one or more hydrophilic groups, which is copolymerizable with (a) and (b).

64. The cleaning/rinsing composition as defined by claim 59, wherein (b) is a $C_3$-$C_8$ carboxylic, sulfonic, sulfuric, phosphonic or phosphoric acids with monoethylenic unsaturation.

65. The cleaning/rinsing composition as defined by claim 59, wherein the monomer (b) is acrylic acid, methacrylic acid, α-ethacrylic acid, β,β-dimethylacrylic acid, methylenemalonic acid, vinylacetic acid, allylacetic acid, ethylidineacetic acid, propylidineacetic acid, crotonic acid, maleic acid, fumaric acid, itaconic acid, citraconic acid, mesaconic acid, N-(methacroyl)alanine, N-(acryloyl)hydroxyglycine, sulfopropyl acrylate, sulfoethyl acrylate, sulfoethyl methacrylate, styrenesulfonic acid, vinylsulfonic acid, vinylphosphonic acid, phosphoethyl acrylate, phophonoethyl acrylate, phosphopropyl acrylate, phophonopropyl acrylate, phosphoethyl methacrylate, phophonoethyl methacrylate, phosphopropyl methacrylate, or phosphonopropyl methacrylate.

66. The cleaning/rinsing composition as defined by claim 62, wherein the monomer (c) is acrylamide, vinyl alcohol, $C_1$-$C_4$ alkyl ester of acrylic acid and of methacrylic acid, $C_1$-$C_4$ hydroxyalkyl ester of acrylic acid and of methacrylic acid, polyalkoxylated ester of acrylic acid and of methacrylic acid, ester of acrylic acid, ester of methacrylic acid and of polyethylene glycol, polypropylene glycol $C_1$-$C_{25}$ monoalkyl ether, vinyl acetate, vinylpyrrolidone or methyl vinyl ether.

67. The cleaning/rinsing composition as defined by claim 59, wherein X is halogen, sulfonate, sulfate, hydrogensulfate, phosphate, phosphonate, citrate, formate or an acetate anion.

68. The cleaning/rinsing composition as defined by claim 59, comprising at least one water-soluble or water-dispersible copolymer having at least one of the following formulae:

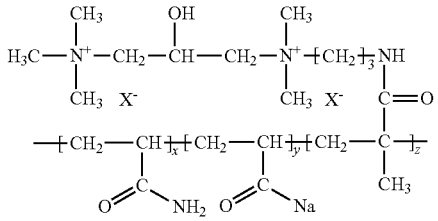

wherein:

x having a mean value of 0 to 50%, y having a mean value of 10 to 95%, z having a mean value of 3 to 80%, and with x+y+z=100%, x, y and z representing the mol % of units derived from acrylamide, acrylic acid (sodium salt) and from Diquat respectively;

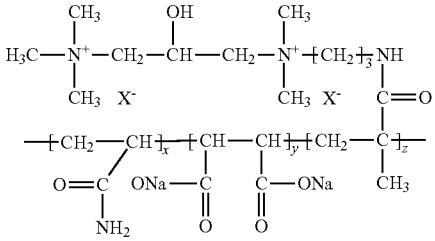

wherein:

x having a mean value of 0 to 50%, y having a mean value of 10 to 95%, and z having a mean value of 3 to 80%;

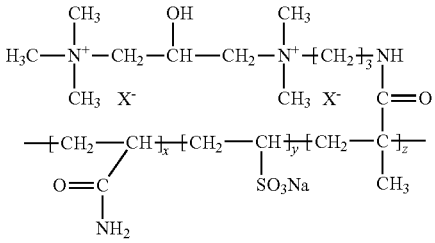

wherein:

x having a mean value of 0 to 50%, y having a mean value of 10 to 95%, and z having a mean value of 3 to 80%;

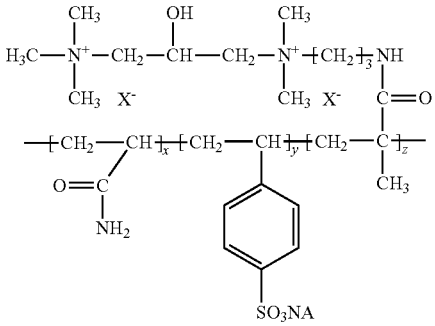

wherein:

x having a mean value of 0 to 50%, y having a mean value of 10 to 95%, and z having a mean value of 3 to 80%;

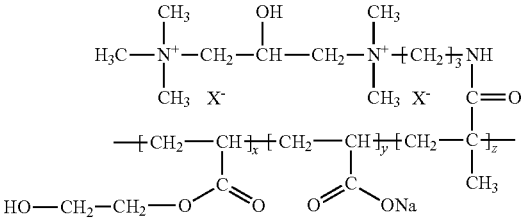

*wherein:*

*x having a mean value of 0 to 50%,*

*y having a mean value of 10 to 95%, and*

*z having a mean value of 3 to 80%;*

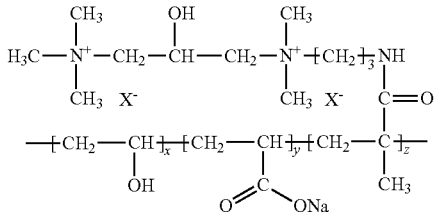

*wherein:*

*x having a mean value of 0 to 50%,*

*y having a mean value of 10 to 95%, and*

*z having a mean value of 3 to 80%; or*

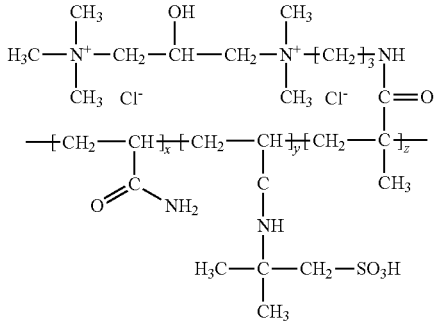

*wherein:*

*x having a mean value of 0 to 50%,*

*y having a mean value of 10 to 95%, and*

*z having a mean value of 3 to 80%.*

*69. A water-soluble or water-dispersible copolymer which comprises the copolymerizate of:*

*(a) at least one monomer compound of general formula I:*

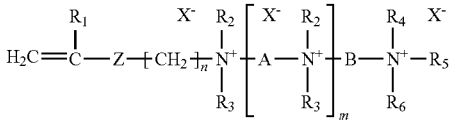

(I)

*in which:*

*$R_1$ is a hydrogen atom, a methyl or ethyl group;*

*$R_2$, $R_3$, $R_4$, $R_5$ and $R_6$ which are identical or different, are linear or branched C1-C6 alkyl, hydroxyalkyl or aminoalkyl groups;*

*m is 0 or 2;*

*n is an integer ranging from 1 to 6;*

*Z is a —C(O)O— or —C(O)NH— group or an oxygen atom;*

*A is a $(CH_2)_p$ group, p being an integer ranging from 1 to 6;*

*B is a linear or branched $C_1$-$C_{12}$, polymethylene chain optionally interrupted by one or more heteroatoms or heterogroups, and optionally substituted by one or more hydroxyl or amino groups;*

*X, which are identical or different, represent counterions; and*

*(b) at least one hydrophilic monomer carrying a functional acidic group which is copolymerizable with (a) and which is capable of being ionized in a cleaning/rinsing medium.*

*70. The water-soluble or water-dispersible copolymer as defined by claim 69, wherein, in the general formula I:*

*Z represents C(O)O, C(O)NH or O;*

*n is equal to 2 or 3;*

*m ranges from 0 to 2;*

*B is*

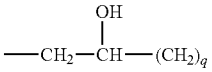

*with q from 1 to 4; and*

*$R_1$ to $R_6$, which are identical or different, represent a methyl or ethyl group.*

*71. The water-soluble or water-dispersible copolymer as defined by claim 69, further comprising:*

*(c) at least one monomer compound with ethylenic unsaturation with a neutral charge which is copolymerizable with (a) and (b).*

*72. The water-soluble or water-dispersible copolymer as defined by claim 71, wherein (c) is a hydrophilic monomer compound with ethylenic unsaturation with a neutral charge, carrying one or more hydrophilic groups, which is copolymerizable with (a) and (b).*

*73. The water-soluble or water-dispersible copolymer as defined by claim 69, wherein (b) is a $C_3$-$C_8$ carboxylic, sulfonic, sulfuric, phosphonic or phosphoric acids with monoethylenic unsaturation.*

*74. The water-soluble or water-dispersible copolymer as defined by claim 69, wherein the monomer (b) is acrylic acid, methacrylic acid, α-ethacrylic acid, β,β-dimethylacrylic acid, methylenemalonic acid, vinylacetic acid, allylacetic acid, ethylidineacetic acid, propylidineacetic acid, crotonic acid, maleic acid, fumaric acid, itaconic acid, citraconic acid, mesaconic acid, N-(methacroyl)alanine, N-(acryloyl) hydroxyglycine, sulfopropyl acrylate, sulfoethyl acrylate, sulfoethyl methacrylate, styrenesulfonic acid, vinylsulfonic acid, vinylphosphonic acid, phosphoethyl acrylate, phophonoethyl acrylate, phosphopropyl acrylate, phophonopropyl acrylate, phosphoethyl methacrylate, phophonoethyl methacrylate, phosphopropyl methacrylate, or phophonopropyl methacrylate.*

*75. The water-soluble or water-dispersible copolymer as defined by claim 71, wherein the monomer (c) is acrylamide, vinyl alcohol, $C_1$-$C_4$ alkyl ester of acrylic acid and of methacrylic acid, $C_1$-$C_4$ hydroxyalkyl ester of acrylic acid and of methacrylic acid, polyalkoxylated ester of acrylic acid and of methacrylic acid, ester of acrylic acid, ester of methacrylic acid and of polyethylene glycol, polypropylene glycol $C_1$-$C_{25}$ monoalkyl ether, vinyl acetate, vinylpyrrolidone or methyl vinyl ether.*

76. *The water-soluble or water-dispersible copolymer as defined by claim 69, said water-soluble or water-dispersible copolymer having one of the following formulae:*

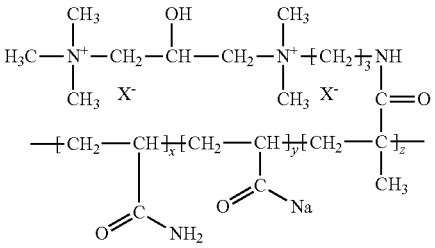

*wherein:*

*x having a mean value of 0 to 50%,*

*y having a mean value of 10 to 95%,*

*z having a mean value of 3 to 80%, and*

*with x+y+z=100%, x, y and z representing the mol % of units derived from acrylamide, acrylic acid (sodium salt) and from Diquat respectively;*

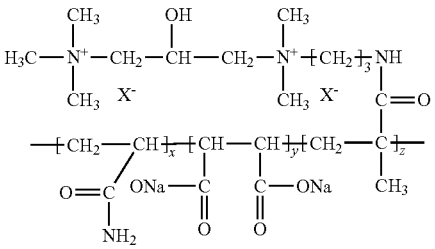

*wherein:*

*x having a mean value of 0 to 50%,*

*y having a mean value of 10 to 95%, and*

*z having a mean value of 3 to 80%;*

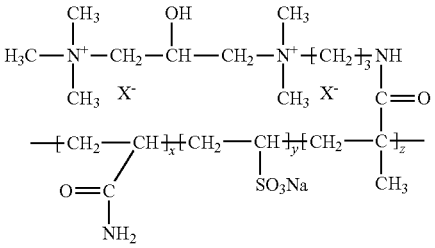

*wherein:*

*x having a mean value of 0 to 50%,*

*y having a mean value of 10 to 95%, and*

*z having a mean value of 3 to 80%;*

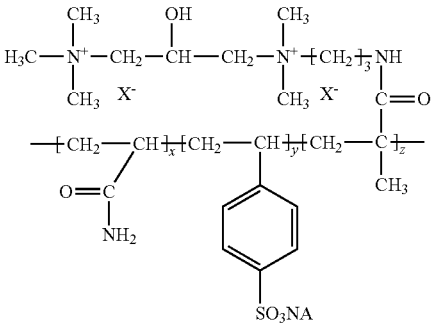

*wherein:*

*x having a mean value of 0 to 50%,*

*y having a mean value of 10 to 95%, and*

*z having a mean value of 3 to 80%;*

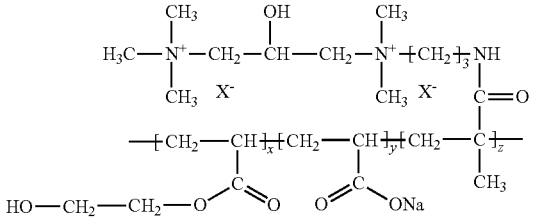

*wherein:*

*x having a mean value of 0 to 50%,*

*y having a mean value of 10 to 95%, and*

*z having a mean value of 3 to 80%;*

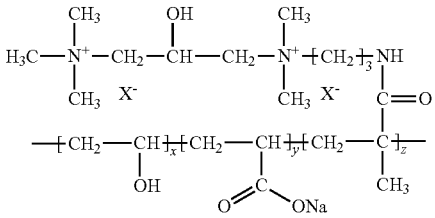

*wherein:*

*x having a mean value of 0 to 50%,*

*y having a mean value of 10 to 95%, and*

*z having a mean value of 3 to 80%; or*

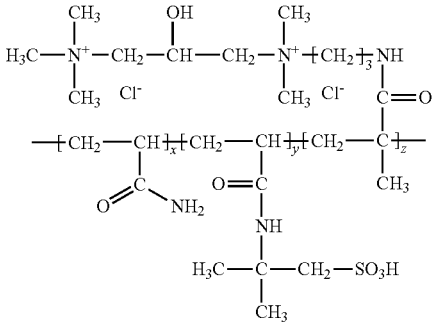

*wherein:*

*x having a mean value of 0 to 50%,*

*y having a mean value of 10 to 95%, and*

*z having a mean value of 3 to 80%.*

77. *A hydrophilized hard surface having at least one water-soluble or water-dispersible copolymer as defined by claim 69 deposited thereon and anchored thereto.*

78. *The cleaning/rinsing composition as defined by claim 59, wherein m is 0 or 2.*

* * * * *